US012167082B2

(12) United States Patent
Olwal et al.

(10) Patent No.: US 12,167,082 B2
(45) Date of Patent: Dec. 10, 2024

(54) ATTENTION TRACKING TO AUGMENT FOCUS TRANSITIONS

(71) Applicant: Google LLC, Mountain View, CA (US)

(72) Inventors: Alex Olwal, Santa Cruz, CA (US); Ruofei Du, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/933,631

(22) Filed: Sep. 20, 2022

(65) Prior Publication Data

US 2023/0086766 A1 Mar. 23, 2023

Related U.S. Application Data

(60) Provisional application No. 63/261,449, filed on Sep. 21, 2021.

(51) Int. Cl.
| | |
|---|---|
| *G06F 3/16* | (2006.01) |
| *G06F 3/01* | (2006.01) |
| *G06T 19/00* | (2011.01) |
| *H04N 21/431* | (2011.01) |
| *H04N 21/442* | (2011.01) |

(52) U.S. Cl.
CPC ....... *H04N 21/44218* (2013.01); *G06F 3/011* (2013.01); *G06F 3/012* (2013.01); *G06F 3/013* (2013.01); *G06F 3/016* (2013.01); *G06T 19/006* (2013.01); *H04N 21/4312* (2013.01)

(58) Field of Classification Search
None
See application file for complete search history.

(56) References Cited

U.S. PATENT DOCUMENTS

| | | | |
|---|---|---|---|
| 8,854,282 B1 | 10/2014 | Wong | |
| 9,837,052 B2 | 12/2017 | Deering et al. | |
| 10,089,966 B2 | 10/2018 | Deering et al. | |
| 10,225,707 B1 | 3/2019 | Scheper et al. | |
| 10,297,088 B2 | 5/2019 | Rhodes et al. | |
| 10,922,889 B2 | 2/2021 | Palos et al. | |
| 2006/0256083 A1 | 11/2006 | Rosenberg | |
| 2013/0021373 A1 | 1/2013 | Vaught et al. | |

(Continued)

OTHER PUBLICATIONS

Chastine, et al., "Studies on the Effectiveness of Virtual Pointers in Collaborative Augmented Reality", IEEE Symposium on 3D User Interfaces, Mar. 8-9, 2008, pp. 117-124, XP031339891.

(Continued)

*Primary Examiner* — Carl Adams
(74) *Attorney, Agent, or Firm* — Brake Hughes Bellermann LLP

(57) ABSTRACT

Systems and methods are related to tracking an attention of a user with respect to content presented on a virtual screen, detecting a defocus event associated with a first region of the content, and determining a next focus event associated with a second region of the content. The determination can be based at least in part on the defocus event and on the tracked attention of the user. The systems and methods can include generating, based on the determined next focus event, a marker for differentiating the second region of the content from a remainder of the content, and in response to detecting a refocus event associated with the virtual screen, triggering execution of the marker associated with the second region of the content.

20 Claims, 12 Drawing Sheets

(56) References Cited

U.S. PATENT DOCUMENTS

| | | | |
|---|---|---|---|
| 2016/0350977 A1* | 12/2016 | Doronichev | H04W 4/21 |
| 2018/0077345 A1 | 3/2018 | Yee | |
| 2019/0236845 A1 | 8/2019 | Rhodes et al. | |
| 2020/0020308 A1 | 1/2020 | Deering et al. | |
| 2020/0106965 A1 | 4/2020 | Malia et al. | |
| 2021/0335147 A1* | 10/2021 | Johnson | G10L 15/26 |

OTHER PUBLICATIONS

Hill, "Augmented reality presents storytelling opportunities in weather", NewscastStudio, Jul. 25, 2017, retrieved from https://www.newscaststudio.com/2017/07/25/augmented-reality-weather/2/ on Jan. 17, 2019, pp. 1-7, XP002788066.

International Search Report and Written Opinion for International Application No. PCT/US2018/061762, mailed Jan. 30, 2019, 17 pages.

Kolivand, et al., "Realistic Real-Time Outdoor Rendering in Augmented Reality", Plos One, vol. 9, No. 9, e108334, Sep. 30, 2014, 14 pages, XP055543772.

"After Effects Tutorial Animated Arrow (Easy)", EpicEditingTuts, https://www.youtube.com/watch?v=7SL00s6IBU8, Aug. 28, 2013, 1 page.

"Easy Arrows Script for After Effects", Modio, https://www.youtube.com/watch?v=xtvKNUsUG78, Nov. 4, 2016, 1 page.

"HOLOLENS—London City Skyline", Fracture, https://www.youtube.com/watch?v=KilkHpM_-b0, Oct. 17, 2016, 1 page.

"Hololens Repairs Elevators", Futurism, https://www.youtube.com/watch?v=_PyCBWgJU68, Sep. 15, 2016, 1 page.

"Hololens WEMO Operator System", twnklsAR, https://www.youtube.com/watch?v=ZiNsjsIN104&feature=emb_logo, Apr. 21, 2017, 1 page.

"Microsoft Hololens for Real Estate Marketing", HolomiaXR, Citadines BIMGroup, https://www.youtube.com/watch?v=rj77sOhj3tU, Apr. 14, 2017, 1 page.

"Powerpoint: Animating Text and Objects", GCFLearnFree.org, https://www/youtube.com/watch?time_continue=1&v=kw_udjD2xwo&feature=emb_logo, Mar. 17, 2016, 1 page.

Allingham, "Hololens Works Inspection", https://www.youtube.com/watch?v=ykVbCy2qI9A, Mar. 26, 2017, 1 page.

Horvitz, et al., "Models of Attention in Computing and Communications: From Principles to Applications", Communications of the ACM, vol. 46, Issue 3, Mar. 2003, 12 pages.

Huberman, et al., "The Economics of Attention: Maximizing User Value in Information Rich Environments", Advances in Complex Systems, vol. 11, No. 4, 2008, pp. 487-496.

Lien, et al., "Soli: ubiquitous gesture sensing with millimeter wave radar", ACM Trans. Graph, vol. 35, No. 4, Article 142, Jul. 2016, 19 pages.

Nijboer, et al., "Driving and Multitasking: The Good, the Bad, and the Dangerous", Frontiers in psychology, vol. 7, Article 1718, retrieved from https://www.frontiersin.org/article/10.3389/fpsyg.2016.01718, Nov. 2016, 16 pages.

Pang, et al., "Directing User Attention via Visual Flow on Web Designs", ACM Transactions on Graphics 35, 6, Article 240, Nov. 2016, 11 pages.

Schoenberg, et al., "uDepth: Real-time 3D Depth Sensing on the Pixel 4", Google AI Blog, retrieved from https://ai.googleblog.com/2020/04/udepth-real-time-3d-depth-sensing-on.html, Apr. 10, 2020, 8 pages.

Vertegaal, "Attentive User Interfaces", Communications of the ACM, vol. 46, No. 3, Mar. 2003, pp. 31-33.

Vertegaal, et al., "Designing for augmented attention: Towards a framework for attentive user interfaces", Computers in Human Behavior 22, 2006, pp. 771-789.

Wong, "3D Animation Arrow Flow", https://www.youtube.com/watch?v=XLy7tDaS5vU, Nov. 4, 2009, 1 page.

International Search Report and Written Opinion for PCT Application No. PCT/US2022/076779, mailed on Jan. 9, 2023, 13 pages.

Qvarfordt, et al., "Conversing With the User Based on Eye-Gaze Patterns", Chi 2005, Papers: Eye Gaze and Multimodal Integration Patterns, Apr. 2-7, 2005, pp. 221-230.

Toyama, et al., "Attention Engagement and Cognitive State Analysis for Augmented Reality Text Display Functions", IUI 2015, Visualization/Video/Augmented Reality, Mar. 29-Apr. 1, 2015, pp. 322-332.

* cited by examiner

ATTENTION TRACKING TO AUGMENT FOCUS TRANSITIONS

CROSS-REFERENCE TO RELATED APPLICATION

This application claims priority to and the benefit of U.S. Provisional Patent Application No. 63/261,449, filed on Sep. 21, 2021, entitled "ATTENTION TRACKING TO AUGMENT FOCUS TRANSITIONS", the disclosure of which is incorporated by reference herein in its entirety.

TECHNICAL FIELD

This description generally relates to methods, devices, and algorithms used to process user attention with respect to content.

BACKGROUND

A display device may enable user interaction with virtual content presented in a field of view on the display device. A user of the display device may be disrupted by interaction and/or other content. After such a disruption occurs, it may be difficult for the user to resume a task associated with the virtual content. Conventional display devices do not account for the cognitive loss that occurs when attempting reengagement with the virtual content after encountering a disruption. Thus, it may be beneficial to provide mechanisms for tracking tasks associated with virtual content viewed in the display device to trigger the display device to respond to the user based on such a disruption, for example.

SUMMARY

A wearable display device can be configured as an augmented reality device where the physical world and augmented content are both visible. A field of view for a user wearing such a device may be interrupted by events occurring in the physical world. The interruptions may arise from external stimuli of one or multiple senses (e.g., auditory, visual, tactile, olfactory, gustatory, vestibular, or proprioceptive stimuli). For example, a voice calling to the user of the wearable display device, a person appearing in a periphery, a person touching the user, a detected smell or taste, a balance shift (e.g., while in transportation), or stumbling on an obstacle. The interruptions may also arise from internal shifts in attention, such as the user remembering or thinking about something that causes a shift in focus. There are also technical constraints, such as screen timeouts, where power and thermals may trigger intermittent display sleep or off modes. Any of such interrupts may introduce cognitive challenges for the user as the user attempts to resume or return to a previous activity. For example, after an interruption or disruption occurs, the user may struggle to resume engagement with content on a virtual screen of the wearable display device. The systems and methods described herein may be configured to assess the focus of the user, assess the type of stimuli, and generate particular focus transition markers (e.g., visual content, visualizations, audial content) to reengage the user with previously accessed content, for example.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method is proposed which comprises tracking an attention of a user with respect to content presented on a virtual screen, detecting a defocus event associated with a first region of the content, and determining a next focus event associated with a second region of the content, the determination being based at least in part on the defocus event and on the tracked attention of the user. The method further comprises generating, based on the determined next focus event, a marker for differentiating the second region of the content from a remainder of the content; and in response to detecting a refocus event associated with the virtual screen, triggering execution of the marker associated with the second region of the content. Executing a marker having a control may relate to the displaying the marking with a virtual control element on the virtual screen upon which the user may act in order to trigger at least on action on the virtual screen. For example, the user may be able to interact with the presented content via the control of the marker.

In an example embodiment, the detecting a defocus event associated with a first region of the content may be electronically detecting a user having previously focused on the first region of the content to no longer focus the first region (e.g., determined by a gaze trajectory of a user's eye or of the user's eyes and thus a viewing focus of the user). For example, a defocus event may be detected by determining that a user looks away from the first region.

Determining a next focus event associated with the second region of the content may be determining a second region of the content at which the user is likely to be looking after a defocus event, wherein a likelihood, in particular a likelihood score for the user focusing on the second region and/or the second region is determined using a prediction model into which information on the detected defocus event (e.g., time when the defocus event occurred, sounds in the surroundings of the user when the defocus event occurred, etc.) and information on the tracked attention of the user (e.g., duration of the user focusing on the first or another region of the presented content a certain amount of time before the defocus event, etc.) are fed as input parameters and which outputs an indication on which second region of the content presented on the virtual screen the user will focus within a threshold amount of time after a defocus event—given the detected defocus event and its circumstances and the previously tracked user attention to the presented content.

Detecting a refocus event may be determining that the user focuses again on the content presented on the virtual screen. The user again focusing on the content occurs after a defocus event associated with the same content. For example, the refocus event may include a detected eye gaze focused upon content that was previously viewed and/or in content in which the user engaged before the defocus event. Thus, a refocus event occurs after an amount of time less than a threshold after a defocus event.

A marker for differentiating the second region may related to a focus transition marker visually presented upon its execution. A corresponding marker may thus be generated after having determined a next focus event. Execution and thus for example activation and/or presentation of the marker on the virtual screen—for, for example, visualizing differences between the second region and the remainder of the content and/or for visually, audibly and/o haptically highlighting the second region—may however just be triggered upon detection the refocus event, i.e., after detecting that the user again focuses on the content presented on the virtual screen.

Implementations may include any of the following features alone or in combination.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
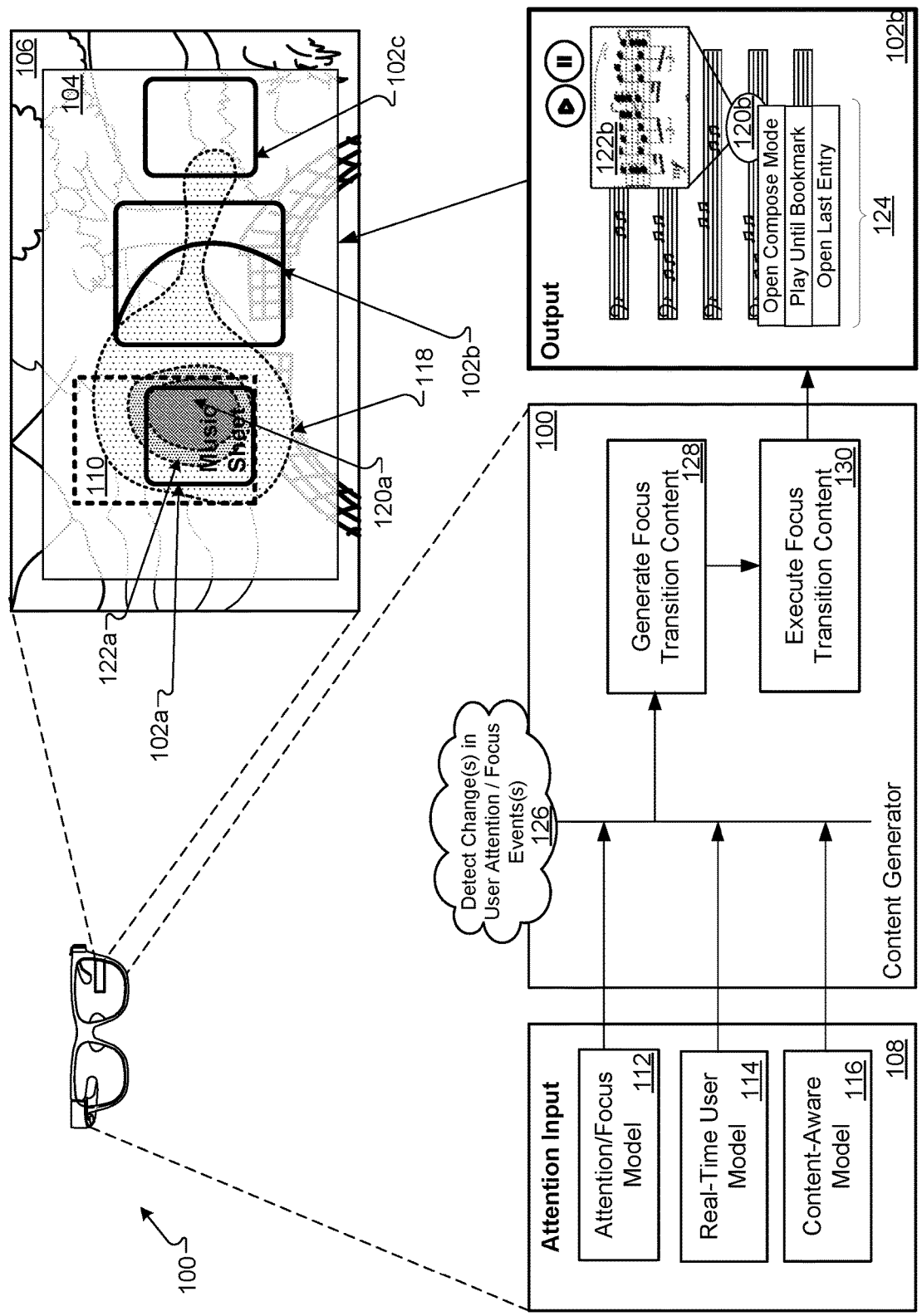
FIG. 1 is an example of a wearable computing device for tracking user attention and generating focus transition markers to assist the user in returning to content provided by the wearable computing device, according to implementations described throughout this disclosure.

This disclosure describes systems and methods for generating user interface (UI) content, audio content, and/or tactile content based on modeled and/or tracked user attention (e.g., focus, gaze, and/or interaction). The UI content or effects for existing display content may be generated to assist a user with regaining focus (e.g., attention) from the physical world to content on a display screen (e.g., a virtual screen of a wearable computing device). For example, when the user becomes distracted from the virtual screen to the physical world, the systems and methods described herein can predict a refocus event and in response to the refocus event occurring, the system may generate and/or modify content for display on the virtual screen in order to help the user become re-immersed into content on the virtual screen.

The UI content, audio content, and/or tactile content described herein may be described as focus transition markers that may include any or all of UI markers, UI modifications, audio output, tactile feedback, augmentations of presented UI content, augmentations of audio content, augmentations of tactile events, and the like. The focus transition markers may assist a user viewing and/or accessing content with the virtual screen, for example, to quickly transition from the physical world back to the virtual screen. In some implementations, the focus transition marker may be part of a computing interface configured for a virtual screen of a battery powered computing device. The computing interface may assess and/or detect particular aspects of attention (e.g., focus) behavior associated with the user accessing the computing interface. In some implementations, particular sensors associated with the virtual screen (or a computing device housing the virtual screen) may be used to assess and/or detect particular aspects of attention behavior associated with the user.

In some implementations, tactile effects may include tactile cues to indicate that changes may have occurred during and after the defocus event, but before a detected refocus event. In some implementations, the tactile effects may be provided by headphone drivers (e.g., bone conducting signals based on speaker signals). In some implementations, the tactile effects may be provided by vibrations generated by components of device. For example, the tactile effects may be provided by linear actuators (not shown) installed in device and configured to generate haptic signals.

In some implementations, the user's attention (e.g., focus) may be modeled and/or tracked with respect to one or more interactions with a display screen (e.g., a virtual screen on an AR device (e.g., an optical see-through wearable display device, a video see-through wearable display device)), for example, and the physical world. The modeled user attention may be used to determine when to display such UI content, audio content, and/or tactile content during an interaction with the virtual screen.

Modeling and/or tracking the user's attention (e.g., focus) can enable the systems and methods described herein to predict actions and/or interactions that the user may next perform. The user's attention and predictive actions may be used to generate one or more focus transition markers, which may represent augmentations (e.g., visualizations) of UI content, augmentations of audio content, augmentations of tactile events, and the like. Focus transition markers may be generated as particular visualization techniques to show differences between regions of content in a virtual screen. In some implementations, presentation of the focus transition markers may provide an advantage of minimizing the time used to switch between content on portions of the virtual screen.

In some implementations, focus transition markers may function to assist users in switching between regions of focus on a virtual screen and regions of focus in the physical world. For example, if a user is wearing (or watching) an electronic device with a virtual screen and looks away from the screen to the physical world, the systems described herein may detect the interruption from viewing the screen, determine a next likely task to be performed and/or viewed in the screen by the user, and generate focus transition marker to assist the user in returning to viewing the screen content.

The generating and presenting of focus transition markers to a user that has been determined to gaze away from a virtual screen (and gaze back to the virtual screen) may provide an advantage of minimizing a time cost and/or cognitive transition cost that occurs for a user when the user is interrupted and/or defocused from the virtual screen to the physical world. Defocusing can include changing the attention of a user. The focus transition marker may be designed to minimize the amount of time utilized to regain attention (e.g., focus, interaction, eye gaze, etc.) from viewing the physical world through an augmented reality (AR) wearable device, for example, to viewing a region of the virtual screen.

In general, focus transition markers (e.g., content) may be generated for display and/or execution in a user interface or associated audio interface of a wearable computing device. In some implementations, focus transition markers may include visual, audio, and/or tactile content intended to focus a user to draw the attention of the user to a particular visual effect, audio effect, movement effect, or other content item being displayed or executed.

As used herein, focus transition markers may include, but are not limited to any one or more (or any combination) of UI content, UI controls, modifications of UI content, audio content, tactile content, and/or haptic events, animations, content rewinding and replaying, spatialized audio/video effects, highlighting effects, deemphasizing effects, text and/or image accentuating effects, three dimensional effects, overlay effects, and the like.

Focus transition markers may be triggered for display (or execution) based on a number of signals. Example signals may include any one or more (or any combination of) gaze signals (e.g., eye gaze), head tracking signals, explicit user input, and/or remote user input. In some implementations, the systems described herein may detect a particular change in one or more of the above signals to trigger focus transition markers to be displayed or removed from display. Executing a marker having a control may relate to the displaying the marking with a virtual control element on the virtual screen upon which the user may act in order to trigger at least on action on the virtual screen. For example, the user may be able to interact with the presented content via the control of the marker.

In some implementations, the systems and methods described herein may utilize one or more sensors onboard a wearable computing device. The sensors may detect signals that may trigger focus transition markers to be displayed or to be removed from display. Such sensor signals may also be used to determine the form and/or function of a particular focus transition marker. In some implementations, the sensor signals may be used as input to carry out machine learning and/or other modeling tasks that may determine the form and/or function of the focus transition marker(s) for particular content.

FIG. 1 is an example of a wearable computing device 100 for tracking user attention and generating focus transition markers to assist the user in returning to content provided by the wearable computing device 100, according to implementations described throughout this disclosure. In this example, the wearable computing device 100 is depicted (e.g., presented) in the form of AR smart glasses (e.g., an optical see-through wearable display device, a video see-through wearable display device). However, any form factor of a battery-powered device may be substituted and combined with the systems and methods described herein. In some implementations, the wearable computing device 100 includes a system on chip (SOC) architecture (not shown) in combination with onboard (or communicative access to) any or all of one or more sensors, attention inputs, machine learning (ML) models, processors, encoders, and the like.

In operation, the wearable computing device 100 may provide a view of content (e.g., content 102a, 102b, and 102c) within a virtual screen 104 as well as a view of the physical world view 106 behind the virtual screen 104. Content depicted on or behind screen 104 may include physical content as well as augmented reality (AR) content. In some implementations, the wearable computing device 100 may be communicably coupled with other devices, such as mobile computing devices, server computing devices, tracking devices, and the like.

The wearable computing device 100 may include one or more sensors (not shown) to detect attention input 108 (e.g., focus, gaze, attention) of the user with respect to content (e.g., 102a, 102b, 102c) depicted on virtual screen 104. The detected attention input 108 (e.g., focus) may be used as a basis for determining which content 102a, 102b, 102c is being viewed. Any or all of the determined content 102a, 102b, 102c may be modified in some fashion to generate a focus transition marker 110 (e.g., content effects) when the device 100 detects a defocus event (e.g., a changed attention of a user) and/or detects a defocus event and then a refocus event on screen 104, for example.

The attention input 108 may be provided to any number of models generated by device 100 or obtained by device 100. The models may include an attention/focus model 112, a real-time user model 114, and a content-aware model 116. Each model 112-116 may be configured to assess particular aspects of user attention and/or content accessed by device 100 to generate particular focus transition markers that may assist the user to return to interrupted tasks or content viewing.

The attention/focus model 112 may represent a real-time model of attention (e.g., focus) and/or interactions of a user based on real time sensor data captured by device 100, for example. The model 112 may detect and track user focus (e.g., attention input 108) on the virtual screen 104 and/or track interactions with the virtual screen 104 as well as track the focus and/or attention and/or interaction with the physical world. In some implementations, the model 112 may receive or detect particular signals (e.g., eye gaze tracking or user input) to track such focus and/or interactions. The signals may be leveraged to determine which part of the content in the virtual screen 104 is currently a focus of the user.

In short, the attention/focus model 112 may be used to determine whether or not a user of device 100 is gazing at the user interface content in the virtual screen 104 or instead gazing beyond the user interface to the physical world. For example, the model 112 may assess an eye gaze signal provided to the user of device 100. The eye gaze signal may be used to generate a model of the user's attention. For example, the eye gaze signal may be used to generate a heat map 118 of eye gaze positions within a predetermined time period. The device 100 can determine for the predetermined time period an amount (e.g., percentage of the screen 104) in which the heat map 118 overlays the virtual screen 104. If the amount is determined to be greater than a predefined threshold, then the device 100 can determine that the map indicates that the user is paying attention to a particular user interface indicated by the heat map. If the amount is determined to be lower than the predefined threshold, then the device 100 can determine that the map indicates that the user is distracted from the user interface.

The content-aware model 116 may represent current and anticipated user attention to particular content on a virtual display. Similar to the attention/focus model, a focus and/or attention of the user may be detected and/or tracked based on eye gaze. The model 116 may determine (or extrapolate) particular motion trajectories as a basis for predicting which actions the user may be about to perform with respect to the content and/or the virtual screen 104. The predictions may be provided to the real-time user model 114, which is generated to model the current attention/focus of the user and the state of the interactions with the content, for example. The model 116 may be used to determine and predict the state of the user interface depicting content in order to predict a task that the user may take upon returning the focus/attention back to the user interface (e.g., content).

In some implementations, the content-aware model 116 may predict motion in sequential content. For example, the content-aware model 116 may model content that includes elements which can be described as a sequence of motion. With such content, the model 116 may determine a predicted focus/attention of the user in order to guide the user upon returning focus/attention to the content. For example, the model 116 can extrapolate the gaze or motion trajectory to highlight (or otherwise mark) one or more locations in which the user may have been looking at if the focus had remained on the content of the virtual screen 104. For example, if the user performs an action that triggers an object to move, the user may follow the trajectory of the object. While the user looks away (i.e., defocus on content), the object continues to move in a trajectory. Thus, when the user refocuses on the content, the model 116 may generate and render focus transition markers to guide the user to the current position of the object.

In some implementations, the content-aware model 116 may predict transitions in sequential actions. That is, for content with elements that can be described as a sequence of actions, (e.g., triggered in user interfaces), focus transition markers may be generated to accentuate a result of a specific action. For example, if clicking a button exposes an icon in a location on the virtual screen 104, the model 116 may determine, based on the content and/or place within the sequence of actions, that the icon could be highlighted when the user refocuses from an interruption back to the virtual screen. Such a highlight may guide the gaze of the user toward the change.

In some implementations, the models 112-116 may function as ML models with prior training based on user input, attention input, etc. In some implementations, the models 112-116 may function based on real-time user attention data. In some implementations, the models 112-116 may function as a combination of ML models and real-time models.

In some implementations, the wearable computing device 100 may detect defocus events and refocus events that may occur near a particular detected focus or attention of the user. The defocus and refocus events may trigger use of any one or more of models 112-116 to generate focus transition markers and related content. For example, the wearable computing device 100 may detect such events and determine how to generate focus transition content to assist the user in refocusing on the content in screen 104, for example. The determination may include assessing content items and/or user interactions to match user focus with particular predicted next actions to generate and provide updated and user-relevant content. In some implementations, the focus transition content includes enlarging depicted content or shrinking depicted content to assist the user in refocusing onto particular content without generating additional content as the focus transition markers.

In a non-limiting example, a user may be viewing content 102a on virtual screen 104. The wearable computing device 100 may track the focus of the user with respect to content 102a (e.g., a region 120 of content 102a) on screen 104. As shown in FIG. 1, the tracked focus may be depicted as a heat map 118 where the main focus is at the center region 120. Thus, in this example, the device 100 may determine that the user is focused upon a music sheet near region 120, shown by a music composition application.

At some point, the user may be distracted or otherwise interrupted by other content or by external physical world view 106. The device 100 may determine that a defocus event occurred with respect to previously focused upon content 102a. While the user is distracted (e.g., determined to be defocused from content 102a), the device 100 may determine a next focus event associated with another region 122 of the content 102a, for example (or other content or region). The determination may be based at least in part on the defocus event and the continual tracked focus of the user corresponding to a gaze trajectory that occurred during a predefined time period before the detected defocus event.

For example, in the music sheet content 102a, the device 100 may determine that when the user returns to focus upon content 102a (or in general to virtual screen 104), the user may be likely to perform a next focus event or action that includes at least engaging with the music composition application near region 120, (e.g., after region 120 content, which may have already been viewed and/or created by the user). The device 100 may then generate, based on the determined next focus event, at least one focus transition marker in the form of focus transition content to differentiate the second region 122 of the content from the remainder of the content shown in virtual screen 104.

In another example, if the user is viewing music sheet content 102a and playing an instrument while following the music sheet content 102a, the user may place a cursor back to another area of the score to allow the user to play a section again or to skip sections.

The focus transition content in this example includes an enlarged version of the second region 122b indicating an accentuated region in which to perform a next focus event based on the last known focus region 120b with a menu 124 for next steps, all of which may be presented as output content 102b. The focus transition markers in this example include enlarged content region 122b to allow the user to begin working on editing a next music phrase. The next music phrase is selected based on the content-aware model 116 which determined that the last focus region for the user was 120a, depicted in output content 102b as marker 120b. The menu 124 represents focus transition markers (e.g., content) to allow the user to begin a next task in the last application that the user used before the defocus event. The menu here includes options to allow the user to open a composing mode, play the music until the marker 120b (e.g., a bookmark), and open the last entry. Other options are possible. In short, the output content 102b represents the content 102a with focus transition markers to assist the user to regain focus on content on the virtual screen 104.

As used herein, a defocus event may refer to a detected lack of attention to content that was previously a focus (e.g., attention) of the user. For example, the defocus event may include a look away of the user detected by wearable computing device 100. In some implementations, the defocus event may include user-related motion such as a head turn, a head lift or lower, a device removal from the user (e.g., removing a wearable computing device), and/or any combination thereof. In some implementations, the defocus event may include an external event detected by device 100 that triggers the user to disengage with content, switch to other content, a selection of different content presenting on a virtual screen, and/or any combination thereof.

As used herein, a refocus event may refer to a detected continued attention to (or focus upon) content that occurs after a defocus event associated with the same content. For example, the refocus event may include a detected eye gaze focused upon content that was previously viewed and/or in content in which the user engaged before the defocus event. Thus, a refocus event may occur after a threshold amount of time after a defocus event.

As used herein, a next focus event may refer to any next step, action, focus, or attention that the user may be predicted to perform after a defocus event. The next focus event may be determined by the models described herein.

In operation, the device 100 may detect attention input 108 and may use any or all of the attention/focus model 112, the real-time user model 114, and/or the content-aware model 116 (or other user input or device 100 input) when device 100 detects 126 a change in user attention/focus. Once the change in attention/focus is determined, the device 100 may trigger generation 128 of focus transition marker(s) and execution 130 of focus transition marker(s) to trigger display of output content 102*b* on virtual screen 104 responsive to detecting a refocus event associated with the screen 104.

In some implementations, the systems and methods described herein may implement content-aware focus transition markers (e.g., augmentations in a user interface) in order to track and guide user attention (e.g., focus, interaction, eye gaze, etc.) within or beyond the display (e.g., virtual screen) of the wearable computing device. Content-aware focus transition markers may include UI, audio, and/or tactile content to assist a user when transitioning between two or more areas of focus. The focus transition markers may include content augmentations that make switching between virtual world content and physical world content less disruptive.

In some implementations, the systems and methods described herein may generate and use content-aware models of current and anticipated user attention (e.g., focus, interaction, eye gaze, etc.) to extrapolate the gaze and/or motion trajectories to anticipate what actions the user is about to take. This information may be provided to a real-time user model of the state of the user, which may be combined with the current UI model and UI state. Thus, the systems and methods described herein can predict where and on what region/content the user is expected to return to after looking away for a time period.

Although multiple models 112-116 are depicted, a single model or a plurality of additional models may be utilized to carry out all modeling and prediction tasks on device 100. In some implementations, each model 112, 114, and 116 may represent a different algorithm or code snippet that may be executed on one or more processors onboard device 100 and/or communicably coupled to device 100 via mobile device, for example.

The wearable computing device 100 is depicted as AR glasses in this example. In general, the device 100 may include any or all components of systems 200 and/or 600. The wearable computing device 100 may also be indicated as smart glasses representing an optical head-mounted display device designed in the shape of a pair of eyeglasses. For example, the device 100 may represent hardware and software that may add information (e.g., project a display) alongside what the wearer views through the device 100.

Although device 100 is shown as the wearable computing device described herein, other types of computing devices are possible. For example, the wearable computing device 100 may include any battery-powered device including, but not limited to a head-mounted display (HMD) device such as an optical head-mounted display (OHMD) device, a transparent heads-up display (HUD) device, an augmented reality (AR) device, or other devices such as goggles or headsets having sensors, display, and computing capabilities. In some examples, the wearable computing device 100 may instead be a watch, a mobile device, a piece of jewelry, a ring controller, or other wearable controller.

Figure 2:
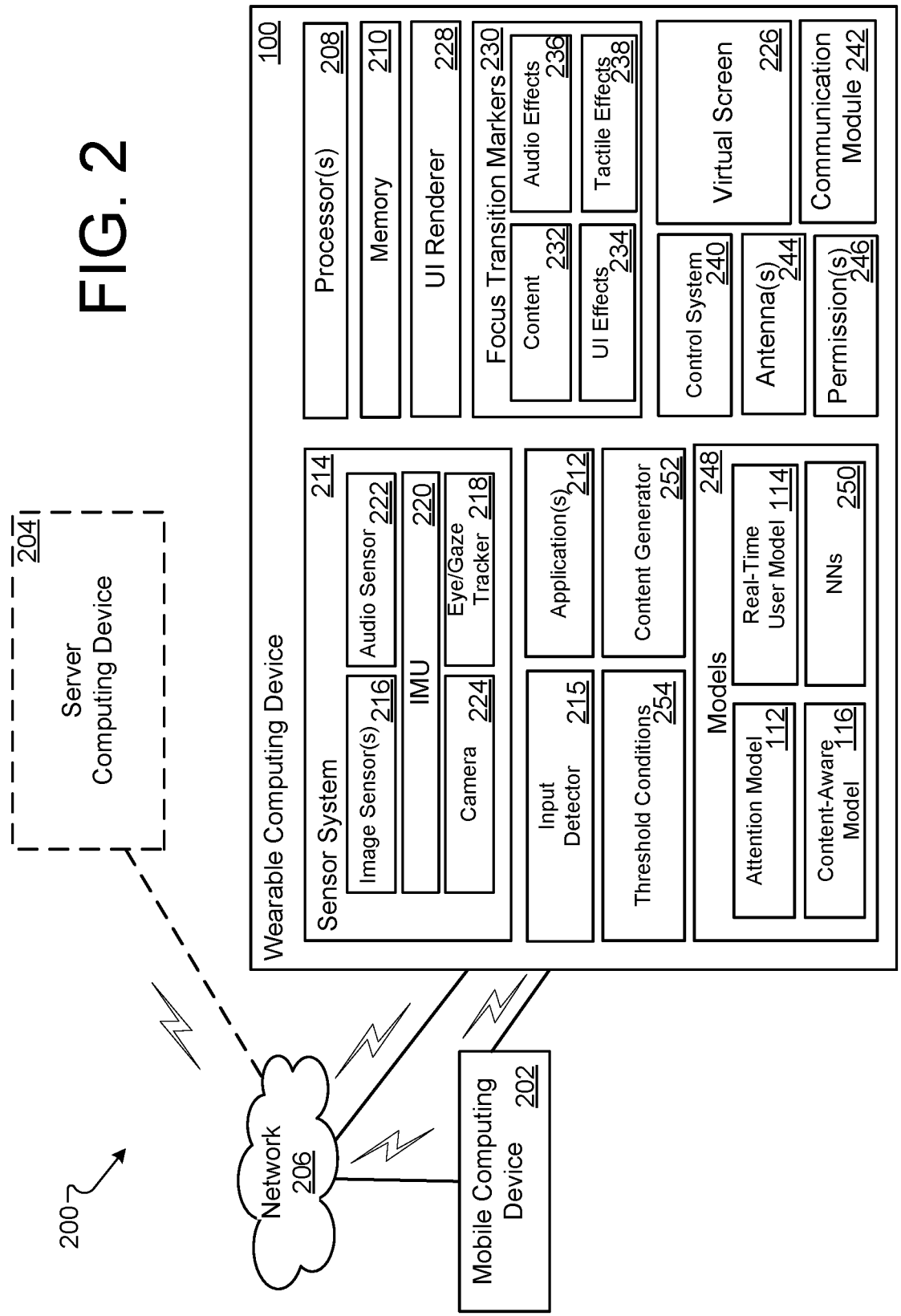
FIG. 2 illustrates a system for modeling and tracking user attention and generating content based on the user attention, according to implementations described throughout this disclosure.

FIG. 2 illustrates a system 200 for modeling and tracking user attention and generating content based on the user attention associated with wearable computing device 100, according to implementations described throughout this disclosure. In some implementations, the modeling and/or tracking may be performed on the wearable computing device 100. In some implementations, the modeling and/or tracking may be shared amongst one or more devices. For example, the modeling and/or tracking may be partially completed on the wearable computing device 100, and partially completed on a mobile computing device 202 (e.g., such as a mobile companion device communicably coupled to device 100) and/or server computing device 204. In some implementations, the modeling and/or tracking may be performed on the wearable computing device 100 and output from such processing is provided to the mobile computing device 202 and/or the server computing device 204 for additional analysis.

In some implementations, the wearable computing device 100 includes one or more computing devices, where at least one of the devices is a display device capable of being worn on or in proximity to the skin of a person. In some examples, the wearable computing device 100 is or includes one or more wearable computing device components. In some implementations, the wearable computing device 100 may include a head-mounted display (HMD) device such as an optical head-mounted display (OHMD) device, a transparent heads-up display (HUD) device, a virtual reality (VR) device, an AR device, or other devices such as goggles or headsets having sensors, display, and computing capabilities. In some implementations, the wearable computing device 100 includes AR glasses (e.g., smart glasses). AR glasses represent an optical head-mounted display device designed in the shape of a pair of eyeglasses. In some implementations, the wearable computing device 100 is or includes a smart watch. In some implementations, the wearable computing device 100 is or includes a piece of jewelry. In some implementations, the wearable computing device 100 is or includes a ring controller device or other wearable controller. In some implementations, the wearable computing device 100 is or includes earbuds/headphones or smart earbuds/headphones.

As shown in FIG. 2, the system 200 includes the wearable computing device 100 communicably coupled to a mobile computing device 202 and optionally communicably coupled to a server computing device 204. In some implementations, the communicable coupling may occur via a network 206. In some implementations, the communicable coupling may occur directly between wearable computing device 100, mobile computing device 202, and/or server computing device 204.

The wearable computing device 100 includes one or more processors 208, which may be formed in a substrate configured to execute one or more machine executable instructions or pieces of software, firmware, or a combination thereof. The processors 208 can be semiconductor-based and may include semiconductor material that can perform digital logic. The processor 208 may include CPUs, GPUs, and/or DSPs, just to name a few examples.

The wearable computing device 100 can also include one or more memory devices 210. The memory devices 210 may include any type of storage device that stores information in a format that can be read and/or executed by the processor(s) 208. The memory devices 210 may store applications 212 and modules that, when executed by the processor(s) 208, perform certain operations. In some examples, the applications 212 and modules may be stored in an external storage device and loaded into the memory devices 210.

The wearable computing device 100 includes a sensor system 214. The sensor system 214 includes one or more image sensors 216 configured to detect and/or obtain image data of displayed content and/or of a user viewing content. In some implementations, the sensor system 214 includes multiple image sensors 216. The image sensor 216 may capture and record images (e.g., pixels, frames, and/or portions of images) and video.

In some implementations, the image sensor 216 is a red, green, blue (RGB) camera. In some examples, the image sensor 216 includes a pulsed laser sensor (e.g., a LiDAR sensor) and/or depth camera. For example, the image sensor 216 may be a camera configured to detect and convey information used to make an image. In some implementations, the image sensor 216 is an eye tracking sensor (or camera), such as eye/gaze tracker 218 that captures movements of an eye of a user accessing device 100, for example.

The eye/gaze tracker 218 includes instructions stored in the memory 210 that, when executed by the processors 208, cause the processors 208 to perform the gaze detection operations described herein. For example, the eye/gaze tracker 218 may determine a location on the virtual screen 226 at which the user's gaze is directed. The eye/gaze tracker 218 may make this determination based on identifying and tracking the location of the user's pupils in images captured by an imaging device (e.g., sensors 216 and/or camera 224) of the sensor system 214.

In operation, the image sensor 216 is configured to obtain (e.g., capture) image data (e.g., optical sensor data) continuously or periodically while the device 100 is activated. In some implementations, the image sensor 216 is configured to operate as an always-on sensor. In some implementations, the image sensor 216 may be activated in response to the detection of an attention/focus change or gaze change associated with the user. In some implementations, the image sensor 216 may track, or an object or region of interest.

The sensor system 214 may also include an inertial motion unit (IMU) sensor 220. The IMU sensor 220 may detect motion, movement, and/or acceleration of the wearable computing device 100. The IMU sensor 220 may include various different types of sensors such as, for example, an accelerometer, a gyroscope, a magnetometer, and other such sensors. In some implementations, the sensor system 214 may include screen embedded sensors that may detect particular user actions, motions, etc., directly from the virtual screen.

In some implementations, the sensor system 214 may also include an audio sensor 222 configured to detect audio received by wearable computing device 100. The sensor system 214 may include other types of sensors such as a light sensor, a distance and/or proximity sensor, a contact sensor such as a capacitive sensor, a timer, and/or other sensors and/or different combination(s) of sensors. The sensor system 214 may be used to obtain information associated with a position and/or orientation of wearable computing device 100. In some implementations, the sensor system 214 also includes or has access to an audio output device (e.g., one or more speakers) that may be triggered to output audio content.

The sensor system 214 may also include a camera 224 capable of capturing still and/or moving images. In some implementations, the camera 224 may be a depth camera that can collect data related to distances of external objects from the camera 224. In some implementations, the camera 224 may be a point tracking camera that can, for example, detect and follow one or more optical markers on an external device, such as, for example, optical markers on an input device or finger on a screen. The input may be detected by an input detector 215, for example.

The wearable computing device 100 includes a virtual screen 226 (e.g., a display). The virtual screen 226 may include a liquid crystal display (LCD), a light-emitting diode (LED) display, an organic light-emitting display (OLED), an electro-phoretic display (EPD), or a micro-projection display adopting an LED light source. In some examples, the virtual screen 226 is projected onto the field of view of the user. In some examples, in the case of AR glasses, the virtual screen 226 may provide a transparent or semi-transparent display such that a user wearing the AR glasses can view images provided by the virtual screen 226 but also information located in the field of view of the AR glasses behind the projected images. In some implementations, the virtual screen 226 represents a virtual monitor that generates a larger screen image than is physically present.

The wearable computing device 100 also includes a UI renderer 228. The UI renderer 228 may function with the screen 226 to depict user interface objects or other content to the user of the wearable computing device 100. For example, the UI renderer 228 may receive images captured by the device 100 to generate and render additional user interface content, such as focus transition markers 230.

Focus transition markers 230 may include any or all of content 232, UI effects 234, audio effects 236, and/or tactile effects 238. The content 232 may be provided by UI renderer 228 and displayed on virtual screen 226. The content 232 may be generated using models 248, and content generator 252 according to one or more threshold conditions 254. For example, the content 232 may be generated by content generator 252 based on models 248 and rendered by UI renderer 228 on virtual screen 226, in response to meeting threshold conditions 254. For example, content 232 may be generated in response to detecting a refocus event associated with the virtual screen 226 (after detecting a defocus event for a time period). The device 100 may trigger execution (and/or rendering) the focus transition marker 230 (e.g., the content 232) at a determined region of the virtual screen 226 based on detecting a refocus event that occurred a predefined time period after the defocus event.

The content 232 may include any one or more of new content depicted over existing displayed content in screen 226. For example, the content 232 may include embellishments, highlights or font changes over existing content or text, symbols, arrows, outlines, underlines, bolding, or other accentuations to existing content. In a similar fashion, the absence of a change in content may indicate to the user that no changes occurred during an interruption or distraction experienced by the user (e.g., during a defocus event).

The UI effects 234 may include any one or more of animations, lighting effects, flashing of content on/off, movement of text or images, replacement of text or images, video snippets to replay content, shrinking/growing of content to accentuate new or missed content, and the like. In a similar fashion, the absence of displayed UI effects may indicate to the user that no changes occurred during an interruption or distraction experienced by the user (e.g., during a defocus event). That is, focus transition markers associated with defocus events may be suppressed in response to determining that changes (e.g., substantive changes) to the content depicted on the virtual screen have not occurred (i.e., during the defocus event and before the next focus event.)

The audio effects 236 may include auditory cues to indicate that changes may have occurred during and after the defocus event, but before a detected refocus event. The audio effects 236 may include audio that is added to the content already available for display on the virtual screen 226, such as an audio cue preset by the user to indicate that content was missed during the defocus time, for example. The preset audio cue may also be provided with visual or tactile data associated with any changes that may have occurred while the user was defocused. In some implementations, the focus transition markers 230 include a video or audio replay of detected changes in the presented content from a time associated with the defocus event up to a time associated with the refocus event. The replay of the detected changes may include visual or auditory cues corresponding to the detected changes. In a similar fashion, the absence of audio effects may indicate to the user that no changes occurred during an interruption or distraction experienced by the user (e.g., during a defocus event).

The tactile effects 238 may include tactile cues to indicate that changes may have occurred during and after the defocus event, but before a detected refocus event. In some implementations, the tactile effects 238 may be provided by headphone drivers (e.g., bone conducting signals based on speaker signals). In some implementations, the tactile effects 238 may be provided by vibrations generated by components of device 100. For example, the tactile effects 238 may be provided by linear actuators (not shown) installed in device 100 and configured to generate haptic signals.

The tactile effects may include haptic content such as vibrations from screen 226 or device 100 or a speaker associated with a wearable ear bud. Tactile effects 238 may also include gestures presented on the screen 226, animations indicating selections to make or changes missed during a defocus time period, replay events that indicate changes missed during a defocus time period, etc.

In some implementations, the focus transition markers 230 include a video or audio replay of detected changes in the presented content from a time associated with the defocus event up to a time associated with the refocus event. The replay of the detected changes include tactile cues (e.g., effects) corresponding to the detected changes.

In some implementations, the tactile effects may provide an indication as to the changes that occurred during a defocus event. For example, the tactile effects 238 may include vibrations to suggest replay of motion, menu presentation and selections, and/or other types of selectable action the user may take to review missed content. In a similar fashion, the absence of tactile may indicate to the user that no changes occurred during an interruption or distraction experienced by the user (e.g., during a defocus event).

The wearable computing device 100 also includes a control system 240 including various control system devices to facilitate operation of the wearable computing device 100. The control system 240 may utilize processors 208, sensor system 214, and/or any number of onboard CPUs, GPUS, DSPs, and the like) operably coupled to the components of the wearable computing device 100.

The wearable computing device 100 also includes a communication module 242. The communication module 242 may enable the wearable computing device 100 to communicate to exchange information with another computing device within range of the device 100. For example, the wearable computing device 100 may be operably coupled to another computing device, to facilitate communication via antennas 244, for example, over a wired connection, a wireless connection via for example, Wi-Fi or Bluetooth, or other type of connection.

The wearable computing device 100 may also include one or more antennas 244 configured to communicate with other computing devices via wireless signals. For example, the wearable computing device 100 may receive one or more wireless signals and use the wireless signals to communicate with other devices such as mobile computing device 202 and/or server computing device 204, or other devices within range of antennas 244. The wireless signals may be triggered via a wireless connection such as a short-range connection (e.g., Bluetooth connection or near-field communication (NFC) connection) or an Internet connection (e.g., Wi-Fi or mobile network).

The wearable computing device 100 may also include or have access to user permissions 246. Such permissions 246 may be preconfigured based on user provided and approved permission with respect to content. For example, the permissions 246 may include permissions with respect to cameras, content access, habits, historical input and/or behavior, and the like. The user may provide such permissions to enable device 100 to identify contextual cues about the user that may be used to anticipate next user actions, for example. If the user has not configured permissions 246, the systems described herein may not generate focus transition markers and content.

In some implementations, the wearable computing device 100 is configured to communicate with the server computing device 204 and/or the mobile computing device 202 over the network 206. The server computing device 204 may represent one or more computing devices that take the form of a number of different devices, for example a standard server, a group of such servers, or a rack server system. In some implementations, the server computing device 204 is a single system sharing components such as processors and memories. The network 206 may include the Internet and/or other types of data networks, such as a local area network (LAN), a wide area network (WAN), a cellular network, satellite network, or other types of data networks. The network 206 may also include any number of computing devices (e.g., computer, servers, routers, network switches, etc.) that are configured to receive and/or transmit data within network 206.

The input detector 215 may process input received from sensor system 214 and/or explicit user input received on virtual screen 226, for example. The input detector 215 may detect attention input (e.g., focus, gaze, attention) of the user with respect to content depicted on virtual screen 226. The detected attention (e.g., focus) may be used as a basis for determining which content is being viewed. Any or all of the determined content may be modified in some fashion to generate a focus transition marker 230 (e.g., content effects) when the device 100 detects a defocus event and/or detects a defocus event and then a refocus event on screen 226, for example.

The attention input may be provided to any number of models 248 generated by device 100 or obtained by device 100. The models 248 shown in FIG. 2 include, but are not limited to the attention model 112, the real-time user model 114, and the content-aware model 116, each of which is described in detail above. Any or all of the models may invoke or access neural networks (NNs) 250 to carry out machine learning tasks onboard the device 100. The NNs may be used with machine learning models and/or operations to predict, and/or detect particular attention focus and defocus and to generate focus transition markers 230 (e.g., content 232, UI effects 234, audio effects 236, and/or tactile effects 238) to assist the user of device 100 with regaining focus on regions of the virtual screen 226.

In some implementations, the processing that is performed on the sensor data obtained by the sensor system 214 are referred to as machine learning (ML) inference operations. An inference operation may refer to an image processing operation, step, or sub-step that involves a ML model that makes (or leads to) one or more predictions. Certain types of processing carried out by wearable computing device 100 may use ML models to make predictions. For example, machine learning may use statistical algorithms that learn data from existing data, in order to render a decision about new data, which is a process called inference. In other words, inference refers to the process of taking a model that is already trained and using that trained model to make predictions.

Figure 3A:
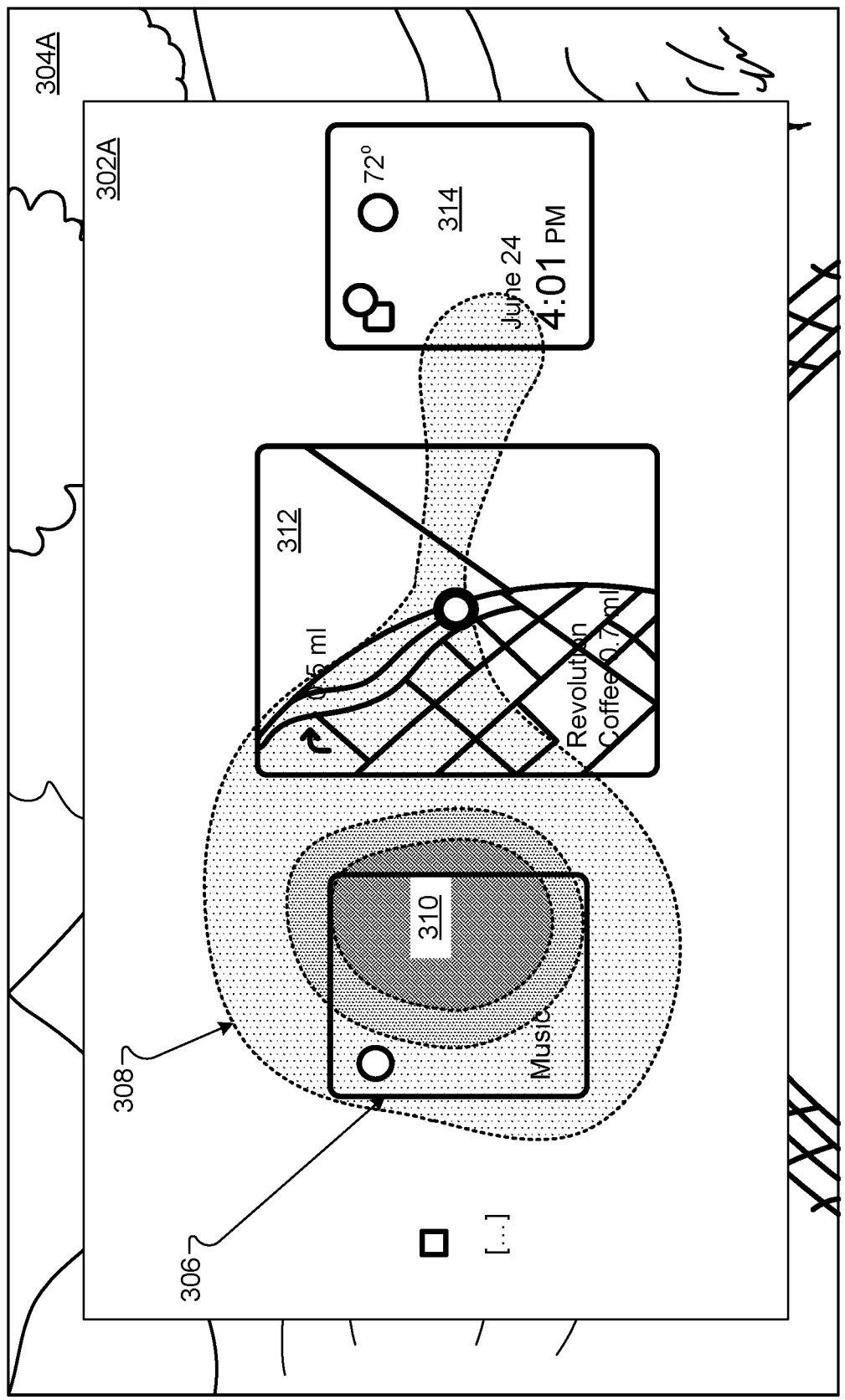
FIGS. 3A-3D illustrate examples of tracking a focus for a user on a display of a wearable computing device and generating content based on the tracked focus, according to implementations described throughout this disclosure.

FIGS. 3A-3D illustrate an example of tracking a focus for a user on a display of a wearable computing device and generating content based on the tracked focus, according to implementations described throughout this disclosure. FIG. 3A depicts a virtual screen 302A with a physical world view 304A in the background. In some implementations, the virtual screen 302A is shown while the physical world view 304A is not shown. In this example, the physical world view 304A is shown for reference, but in operation, the user may be detected to be viewing the content on the virtual screen 302A and thus, the physical world view 304A may be removed from view, blurred, transparent, or other effect to allow the user to focus on the content depicted on the screen 302A.

In this example, the wearable computing device 100 may determine via eye/gaze tracker 218 (or other device associated with sensor system 214) that a user operating device 100 is paying attention to (e.g., focusing on) the content 306, which is shown here as a music application. The eye/gaze tracker 218 can track the eye/gaze of the user and generate a map 308, with a highest intensity gaze shown as a gaze target 310. The map 308 is generally not provided for view by the user operating device 100 and is shown here for illustration purposes. However, the map 308 may depict representative gaze analysis performed by the sensor system 214 to determine the gaze (e.g., attention, focus) of the user with respect to content of screen 302A and/or content of physical world view 304A.

Because the device 100 detects that the user is focused on content 306, the device 100 may modify content 306 to place the content 306 in a more central portion of the screen 302A. In some implementations, the device 100 may enlarge the content 306 to allow the user to interact with additional content associated with content 306. The gaze target 310 may change over time as the user interacts with content 310, 312, 314, and/or other content configured for display in screen 302A. In addition, the gaze target 310 may change if the user receives an interruption from the physical world view 304A. For example, at some point the user may change attention/focus to another region of screen 302A or to content in view 304A.

Figure 3B:
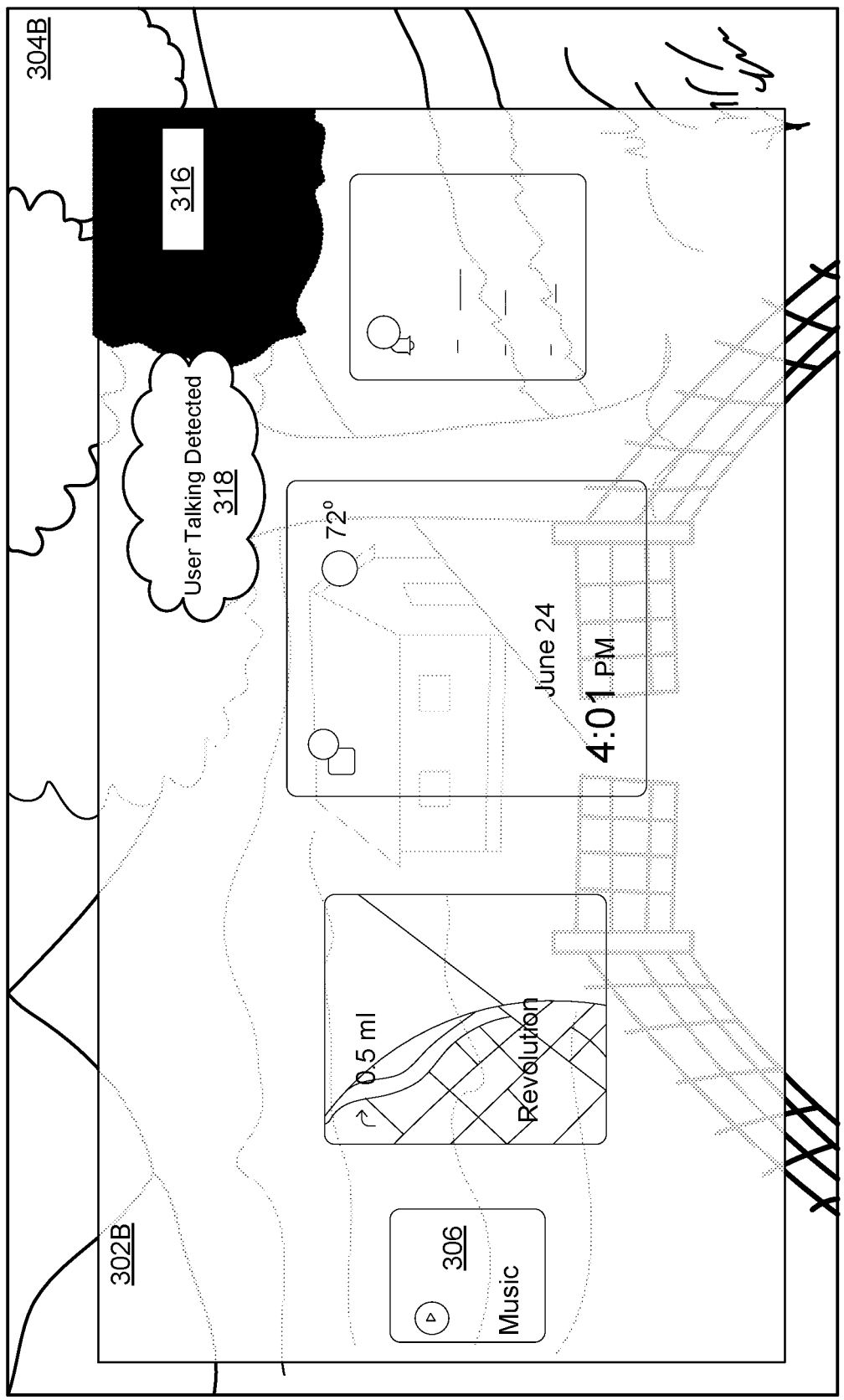

As shown in FIG. 3B, the user may have received an interruption from the physical world. The interruption may be visual, audial, or tactile in nature. The interruption may trigger the eye gaze of the user to move to another focus or be removed from an original focus (e.g., gaze target). For example, the user may hear another user call out the user's name, as shown by indicator 318. The user may then defocus from content 306 in screen 302B and the focus (e.g., attention, gaze target) may change, as shown by map 316, which depicts the eye gaze change of the user. In this example, the eye/gaze tracker 218, for example, may detect that the user is looking beyond the screen 302B and may begin to trigger changes in presentation of content on device 100. For example, the device 100 may begin to transparently show the physical world view 304B through the screen 302B. In some implementations, the device 100 may remove the screen 302B from view or may blur, or exhibit other effects to allow the user to focus on the content depicted in physical view 304B.

Figure 3C:
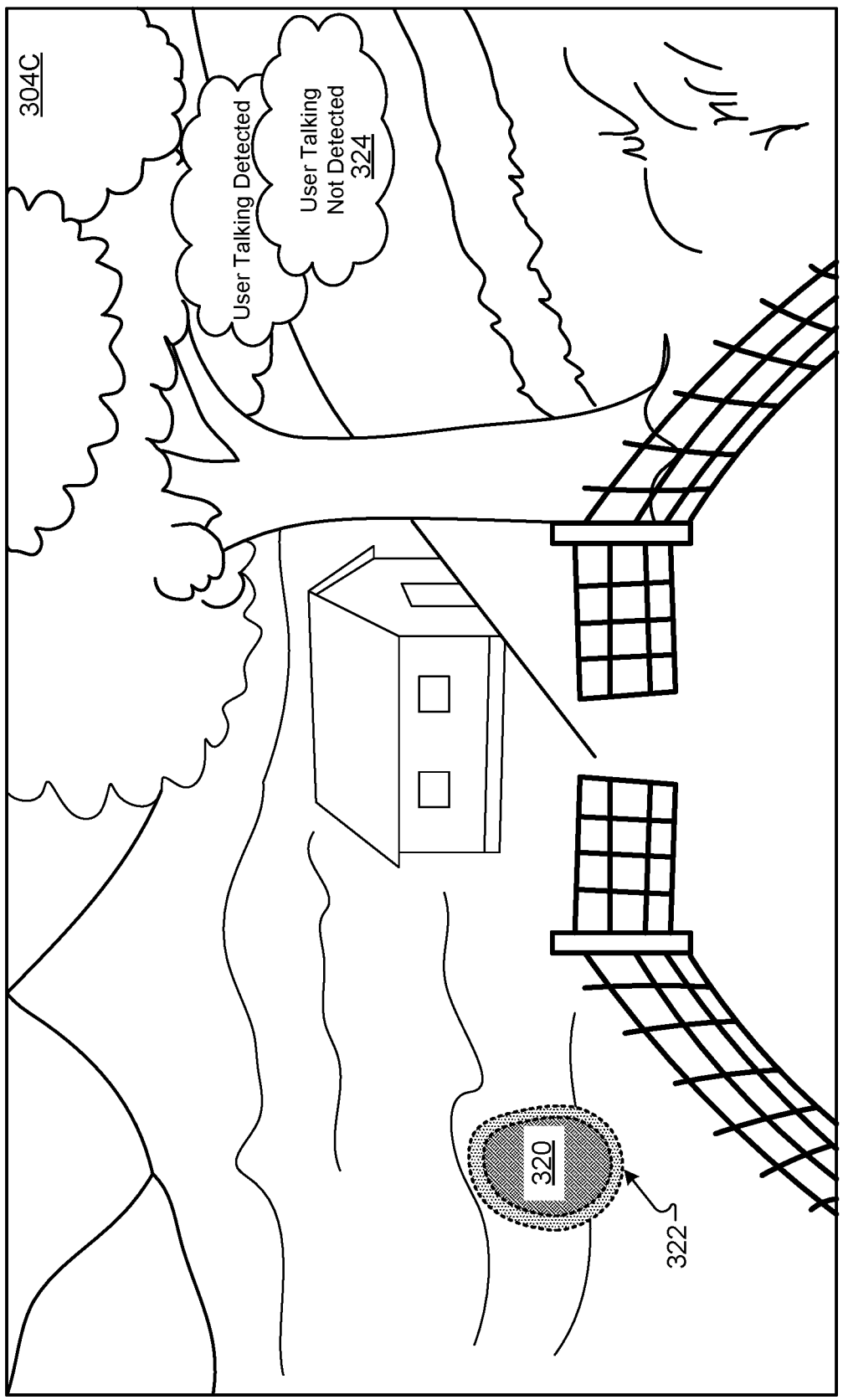

As the device 100 (e.g., the eye/gaze tracker 218) detects the change in gaze from 310 (FIG. 3A) to 316 (FIG. 3B), the device 100 may turn off the display of the screen 302B after a predetermined amount of time, as shown in FIG. 3C. In this example, the device 100 may detect a change in user focus, as shown by the user changing an eye/gaze to region 320, as shown by map 322. In addition, the device 100 may detect that the user talking is not detected, as shown by indicator 324. The indicator 324 may not be shown to the user of device 100, but may instead be determined and/or detected by the device 100 and used as input (e.g., via input detector 215) to indicate that the user from physical environment 304C has stopped talking. This audio cue combined with the user's change in gaze/focus/attention (e.g., to region 320) may trigger the device 100 to trigger focus transition markers 230 based on the input to draw the user back to a point of focus associated with the virtual screen rather than the physical world.

Figure 3D:
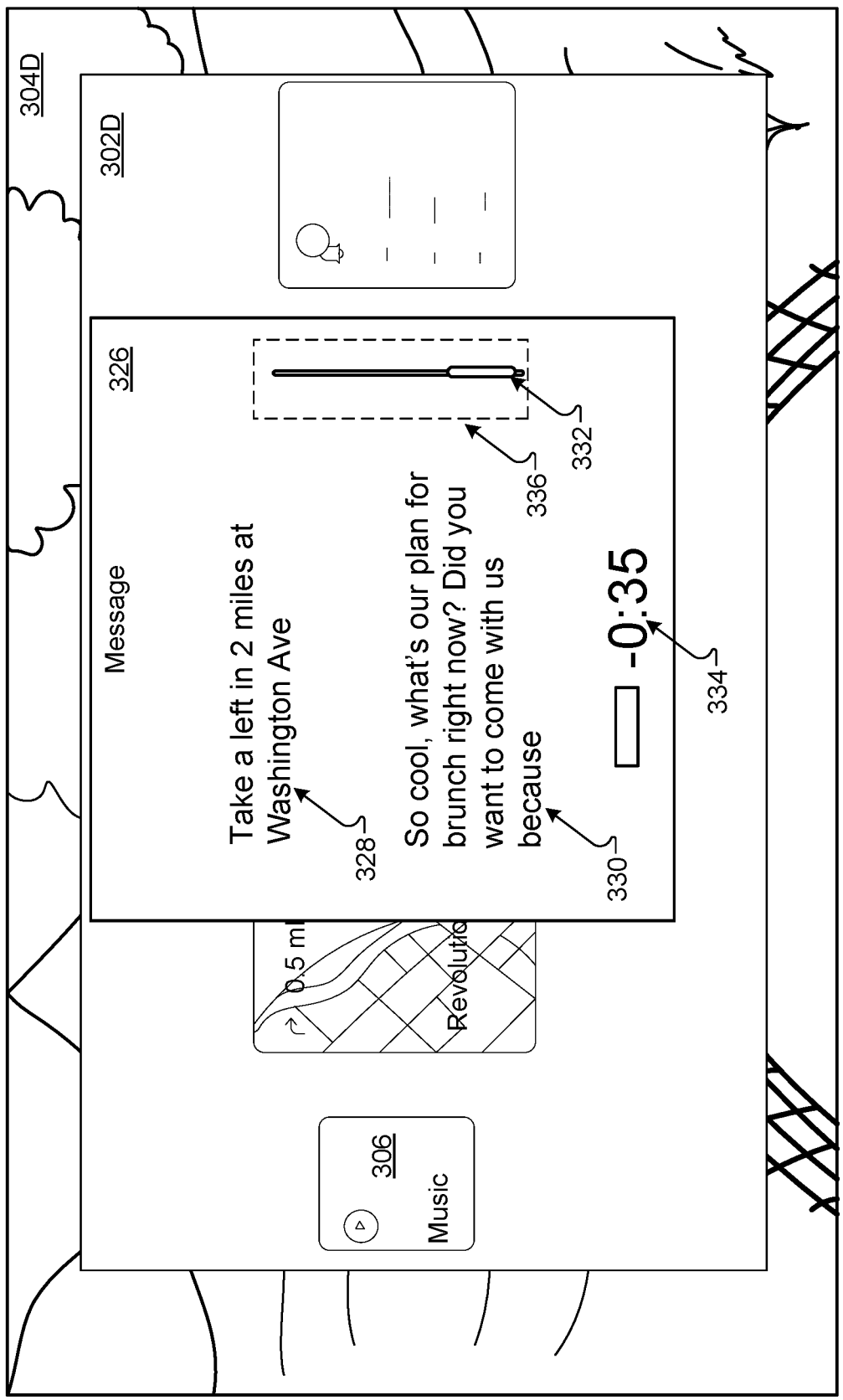

For example, the eye/gaze tracker 218 may detect that the user is no longer focused on physical world view 304C and may detect that the user is trying to refocus on (e.g., or explicitly access) a virtual screen, as shown in FIG. 3D as virtual screen 302D. In this example, the device 100 may have determined that the next logical item that the user may focus attention upon content 312 from the prior interface (302A). Such a determination to select content 312 may have been based on the user previously focused upon content 310 to modify the music application, but the user's gaze was beginning to drift (as shown by map 308) toward content 312, which is a mapping application with directions underway. The drift may be interpreted as a gaze trajectory that occurred during a predetermined time period before the detected defocus event.

In operation, the device 100 may trigger models 248 to determine a next step or action based on previous steps or actions. The trigger may occur at the time of defocus from the screen 302A, for example. Once the device 100 determines that content 312 is the likely next gaze target or action, the system can generate focus transition markers 230 to assist the user in focusing quickly onto content 312 when the focus/attention is detected to return to a virtual screen, as shown in FIG. 3D in virtual screen 302D.

Responsive to detecting that the user is predicted to soon pay attention to content 312, the content generator 252 may generate focus transition markers to help the user immerse user attention/focus to content 312 of screen 302D. The focus transition markers here include content 326 which indicates the missing directions and messages pertaining to the directions that may have been received while the user was paying attention to 304C, for example. Here, the content 326 includes a missed address direction 328 and a missed message 330 from another user. The content 326 also includes a control 332 that may allow the user to rewind to a time 334, of 35 seconds in this example, to view any other missed content that may have occurred in the last 35 seconds. In some implementations, such a control 332 may be provided when content 326 is video, audio, instructions, or other sequential content that the user may have been viewing on screen 302C before the interruption. In some implementations, the time 334 may be adjusted to an exact amount of time between a defocus event and a refocus event to allow the user to catch up and/or replay any or all missed content. In some implementations, the control 332 may be highlighted or otherwise accentuated to indicate selection, as shown by highlight 336. Other visualizations are of course possible.

In some implementations, the replay and/or control 332 may provide options to replay missed content at a standard speed or an accelerated speed. In some implementations, the replay may be triggered based on a refocus event and the user detected to be focusing upon a particular object, control, or region of a UI. For example, a user may trigger a replay of music scores when gazing to the beginning of the score. In another example, the user may trigger a summary for a teaching lesson by triggering a replay after glancing away from the teacher and back to the teacher. In this way, the user may have an instant replay function that can be used in real time when the user missed a previous few seconds or minutes of content.

In some implementations, the device 100 may employ models 248 to identify what a user is current attending to (e.g., focused upon) by measuring or detecting characteristics such as user input, user presence, user proximity to content, user or content or device orientation, speech activity, gaze activity, content interaction, and the like. The models 248 may be used to infer (e.g., determine, predict) knowledge about the priorities that govern the user's attention. The knowledge may be used to statistically model attention and other interactive behaviors performed by the user. The models 248 may determine a relevance of information or actions in the context of current user activity. The relevance of information may be used to present any number of options and/or focus transition markers (e.g., content) in which the user may actively select upon or passively engage with. Therefore, the device 100 may generate focus transition markers that may enhance data and/or content presented in regions where a user is determined to be focusing, while attenuating other peripheral or background details.

FIGS. 4A-4D illustrate example user interfaces depicting focus transition markers, according to implementations described throughout this disclosure. To generate the focus transition markers, the device 100 may generate and use a real time user model 114 representing user attention. For example, the device 100 may track the user's focus (e.g., attention) and/or interactions across virtual screens (e.g., user interfaces in an HMD or AR glasses) and the physical world (e.g., a conversation partner in a meeting). The device 100 may leverage detected signals obtained from gaze tracking or explicit user input in order to predict with high accuracy, what part (or region) of the screen contents the user is interacting with.

Figure 4A:
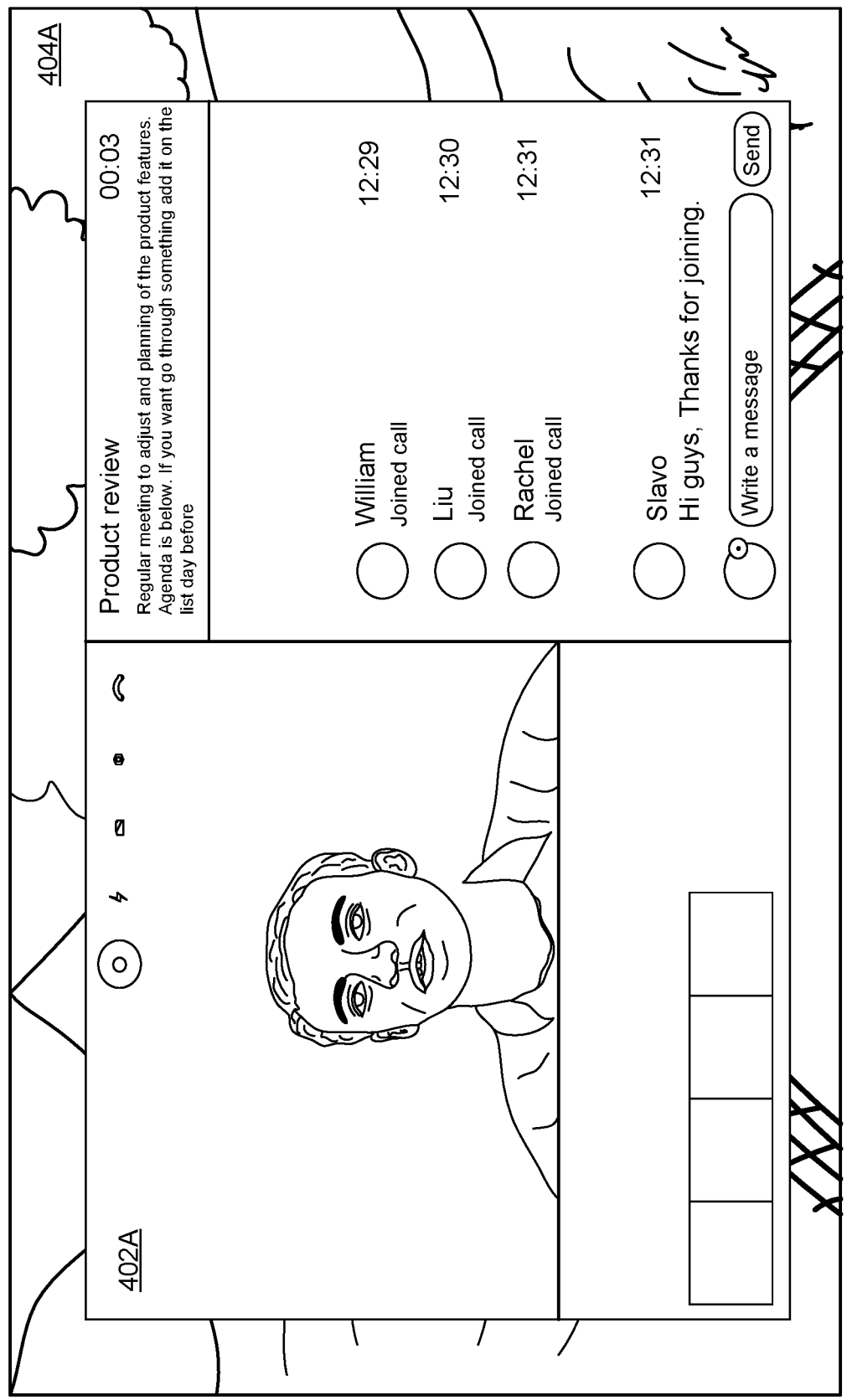
FIGS. 4A-4D illustrate example user interfaces depicting focus transition markers, according to implementations described throughout this disclosure.

As shown in FIG. 4A, a video conference is being hosted in virtual screen 402A of device 100 and a physical world view 404A is shown in the background. Here, the user may be joining a new call with a number of other users. At some time, the user may be distracted and device 100 may detect a defocus event associated with a particular region of screen 402A. During the defocus event, the device 100 may determine a next focus event associated with a second region of the screen 402A (or a next focus event associated with the same first region). The next focus event may be based at least in part on the defocus event and on the tracked focus of the user. The tracked focus of the user may correspond to a gaze trajectory that occurred during a time before the detected defocus event. For example, the time may include a time of a few seconds before the defocus event up to a time of the defocus event.

The device 100 may generate, based on the determined next focus event, a focus transition marker 230 (e.g., and/or content) in order to differentiate the second region of the content from a remainder of the content. In some implementations, the focus transition marker 230 may be to differentiate the first region and an updated version of the first region that may have occurred over time.

Figure 4B:
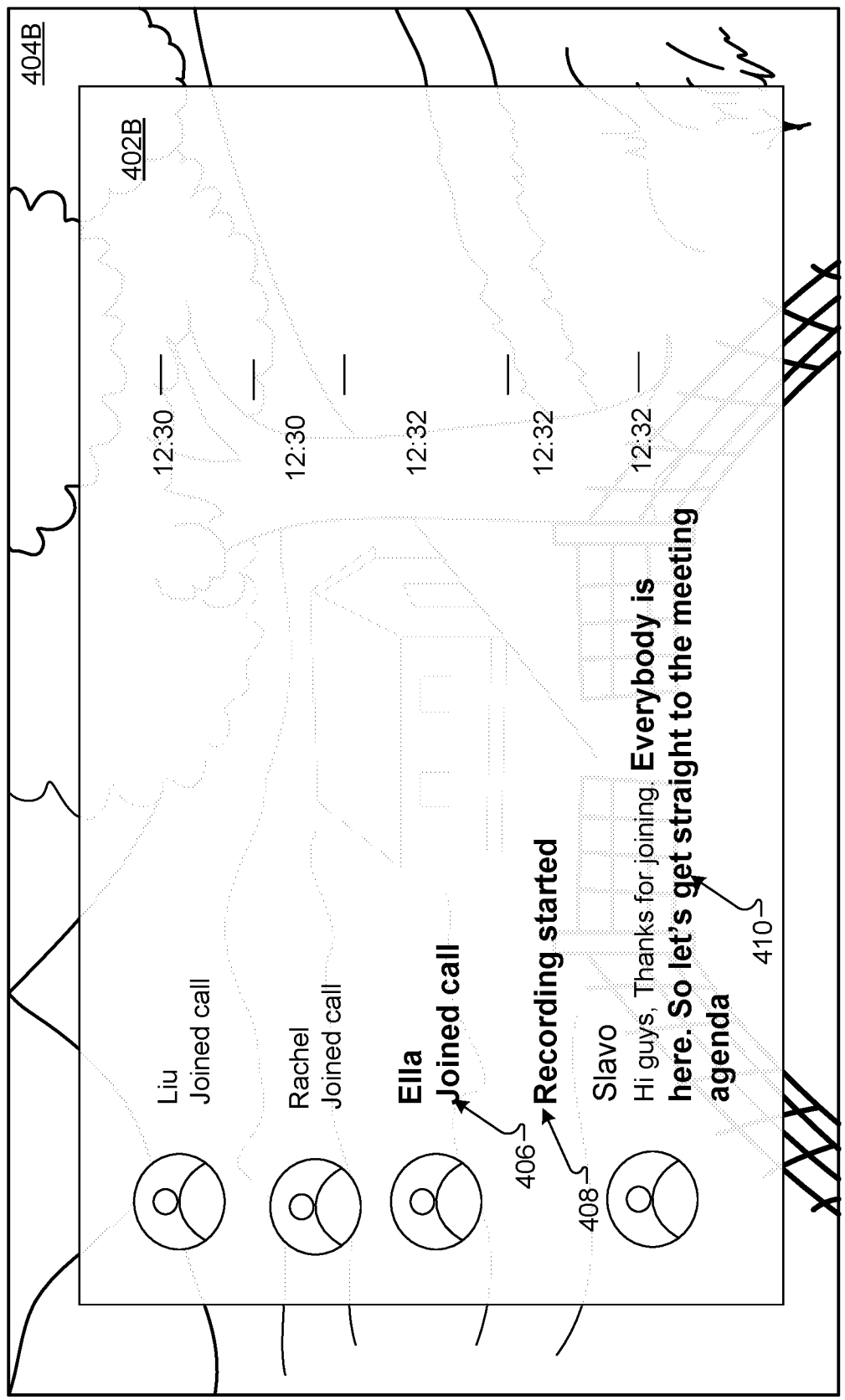

As shown in FIG. 4B, the defocus event and refocus event may have occurred. The device 100 may have generated the content in virtual screen 402B to function as markers 230 to assist the user in transitioning back to the previous and ongoing content from FIG. 4A.

In some implementations, a focus transition marker 230 may be used to show new content in real-time streams. For example, when the user defocuses (e.g., a defocus event) during a live stream, transcription, translation, or video, the device 100 can highlight new content that is appearing upon detecting a refocus event back to the live stream, etc. When the refocus event occurs, the system can differentiate new content versus old content. Thus, the highlight may be a focus transition marker that functions to steer the focus/attention of the user to a useful and practical place in the screen. In some implementations, the highlight can fade away after a short timeout. In some implementations, the transcription may also scroll up to where the user's attention was last detected (e.g., scroll back 20 seconds ago).

In this example, while the user defocused, Ella joined 406 the call at 12:32, the meeting was triggered 408 for recording, and Slavo spoke additional words 410. The device 100 generated the markers 230 as bolded new content 406, 408, and 410 to differentiate the new content 406, 408, and 410 from the already viewed (un-bolded) content of screen 402B. Other effects can, of course, be substituted for text modifications. In addition to modifying the text, the device 100 resized the content of screen 402B to show a pertinent set of content to make the changes more apparent to a user attempting to refocus. The content shown in screen 402B may be generated, executed and triggered for display (e.g., rendering) in a UI, for example, in response to detecting the refocus event associated with the virtual screen 402B (or 402A).

Figure 4C:
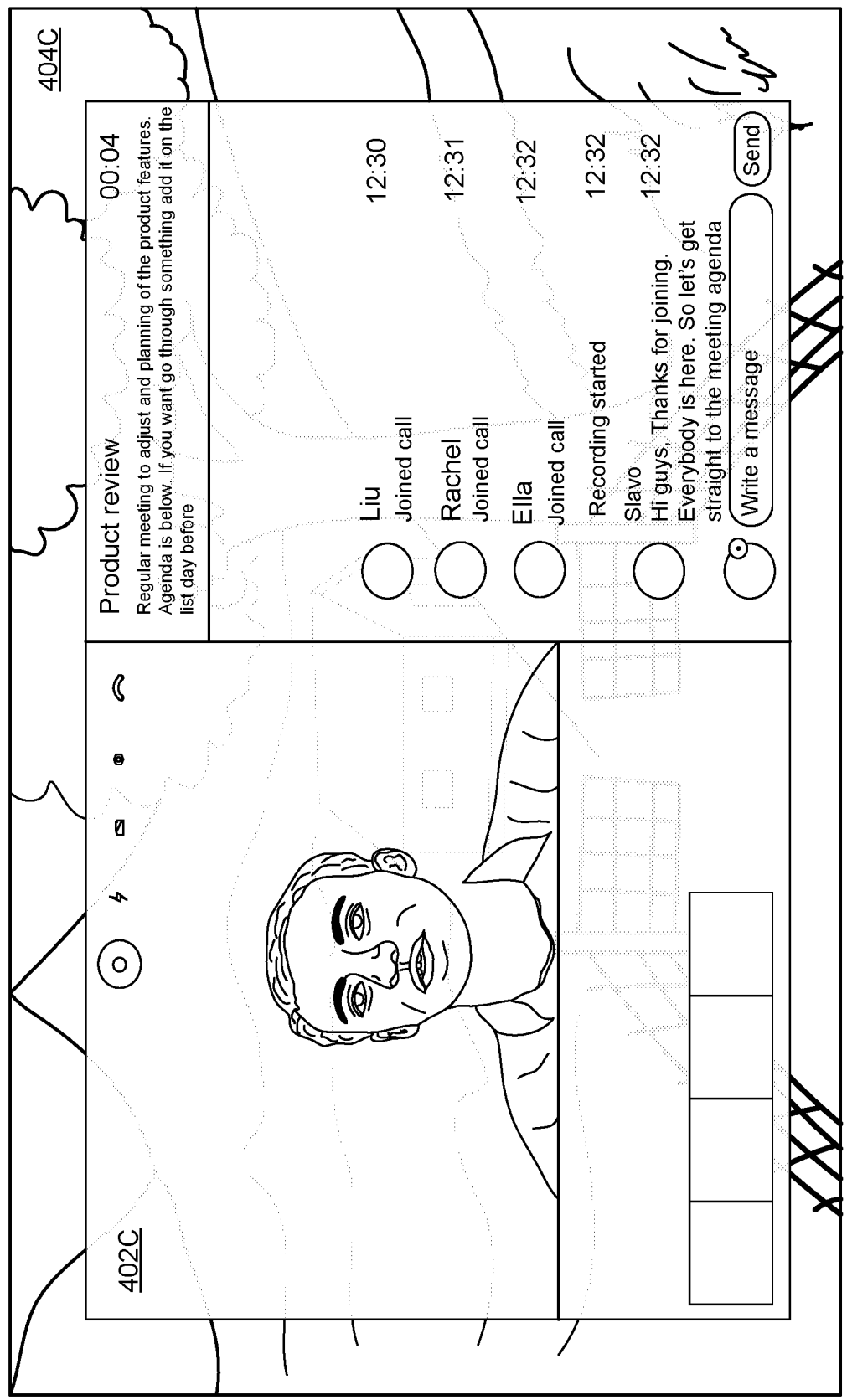

In some implementations, after a predetermined amount of time, the live stream may be depicted again in full, as shown in FIG. 4C with respect to screen 402C and physical world view 404C. In this example, the bolded text is shown faded back to the original text without the markers/content highlights.

Figure 4D:
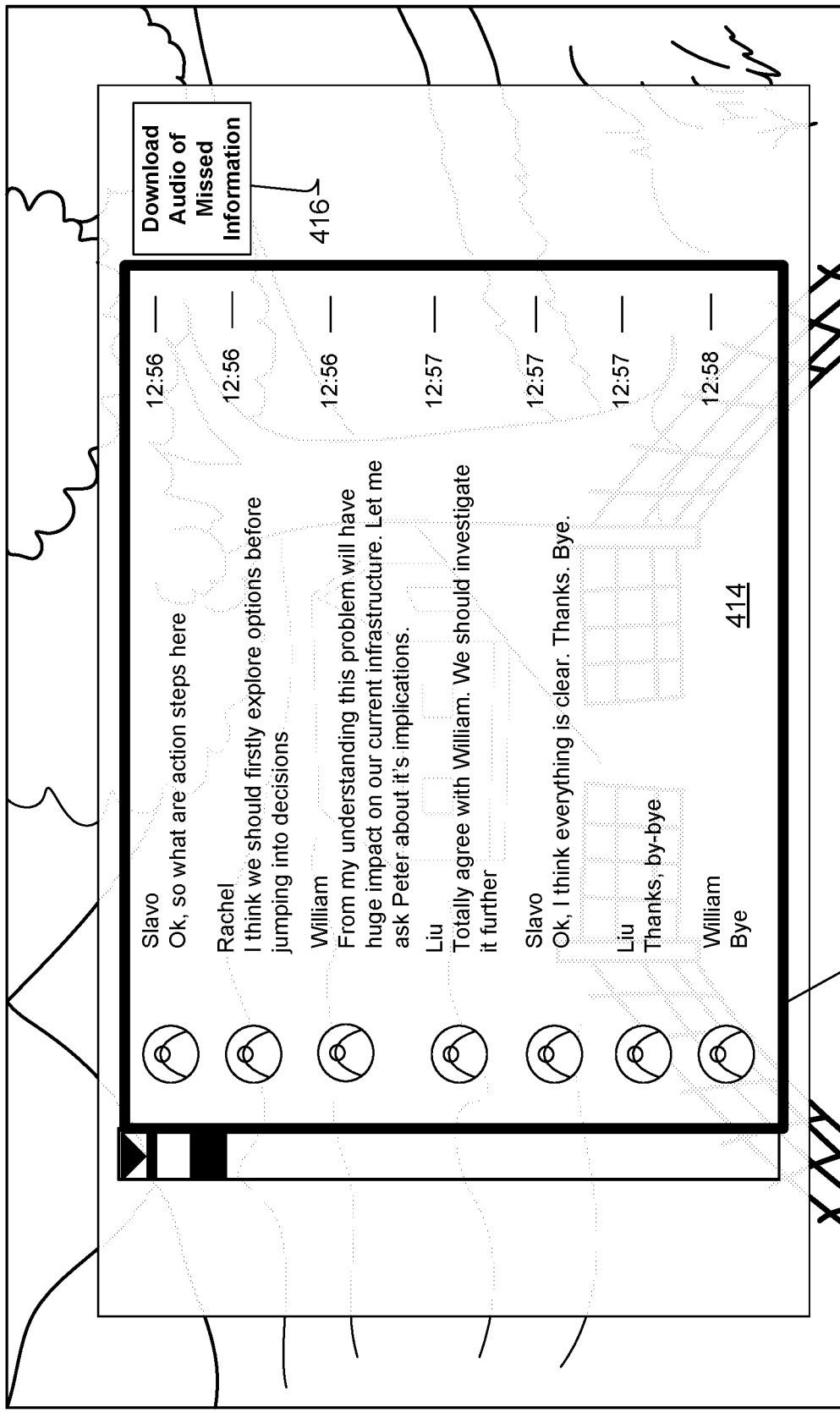

At some time, the user may defocus and refocus again. FIG. 4D depicts another example of a refocus event where focus transition markers 230 may be generated to assist the user. In this example, the user may have missed several minutes of content based on a disruption and may wish to view missed items. Here, the user may not wish to read the updates of the meeting presented as marker 412 depicting a box of scrollable content 414. If the device 100 detects that the content may be substantial and that it may be difficult for the user to find the last known content before the defocus event, the device 100 may generate a marker such as marker 416 which includes a control to download and play audio of the missed information. The user may be presented marker 416 and may select the marker 416 to begin playing audio from a point of defocus.

In some implementations, the device 100 may generate content (e.g., focus transition markers) for content with elements that can be described as a sequence of motion. For example, the device 100 may utilize sensor system 214 to detect a sequence of motion and anticipate user attention based on the sequence and the state of the UIs/content/user action within the sequence. For example, gaze or motion trajectory may be detected by sensor system 214 and used to generate focus transition markers 230 for a sequence of motion. By extrapolating the gaze or motion trajectory, the device 100 may highlight a region or position where the user would have been looking (e.g., based on predictive models 248) if the user had stayed focused on the virtual screen. For example, if the user performs an action that triggers an object to move, the device 100 (and the user) may follow the trajectory of the object. While the user is defocused (e.g., looking away), the object will keep moving, and when the user refocuses (e.g., looks back), the device 100 may guide the user to the current position of the object using content, shapes, highlights, or other such marker.

In some implementations, the device 100 may predict transitions in sequential actions. That is, for content with elements that can be described as a sequence of actions (e.g., triggered in user interfaces), focus transition markers may direct the user to a result of a specific action. For example, if selecting a UI button exposes an icon in a region on the virtual screen, the icon could be highlighted when the user focuses back on the virtual screen to guide the user's gaze towards the change.

In some implementations, the focus transition markers may show differences in sequential content. For example, without performing predictions, the device 100 may generate markers 230 to briefly highlight what has changed on the virtual screen. In another example, if the user is watching a transcript and some words were corrected while the user was defocused (e.g., looking away), the corrected words could be highlighted as markers for display to the user when the user refocuses. For differences that are spatial or where motion is a cue, the device 100 can highlight using different visualization techniques, for example, illustrating motion vectors with streamlines and the like.

Figure 5:
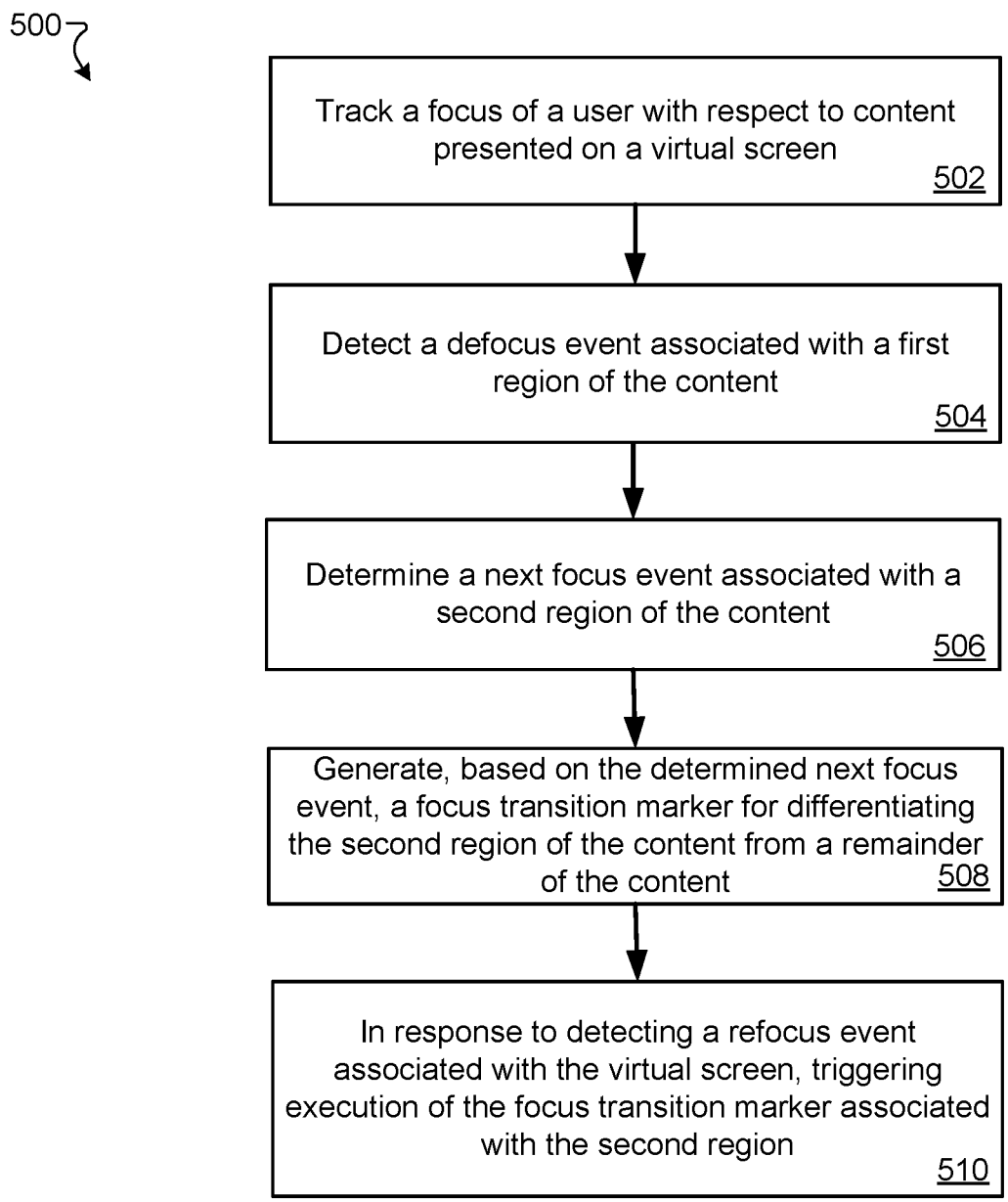
FIG. 5 is a flow chart diagramming one example of a process to track user focus and generate focus transition content responsive to the user focus, according to implementations described throughout this disclosure.

FIG. 5 is a flow chart diagramming one example of a process 500 to perform image processing tasks on a computing device, according to implementations described throughout this disclosure. In some implementations, the computing device is a wearable computing device that is battery-powered. In some implementations, the computing device is a non-wearable computing device that is battery powered.

The process 500 may utilize a processing system on a computing device with at least one processing device, speaker, optional display capabilities, and memory storing instructions that when executed cause the processing device to perform the plurality of operations and computer implemented steps described in the claims. In general, the computing device 100, systems 200, and/or 600 may be used in the description and execution of process 500. The combination of device 100 and systems 200 and/or 600 may, in some implementations, represent a single system. In general, process 500 utilizes the systems and algorithms described herein to detect user attention and use the user attention to generate and display focus transition markers (e.g., content) to assist the user in focusing quickly when returning attention/focus to a virtual screen.

At block 502, the process 500 includes tracking a focus of a user with respect to content presented on a virtual screen. The tracked focus may include gaze, attention, interaction, and the like. For example, the sensor system 214 and/or input detector 215 may track focus and/or attention of a user with respect to content (e.g., content 310, 320, etc.) presented for display on a virtual screen 226. In some implementations, the tracking may be performed by eye/gaze tracker 218. In some implementations, the tracking may be performed by image sensor 216 and/or camera 224. In some implementations, the tracking may be performed by the IMU 220. In some implementations, tracking may include assessing and tracking signals that include any one or more (or any combination of) gaze signals (e.g., eye gaze), head tracking signals, explicit user input, and/or remote user input. In some implementations, models 248 may be used to assess tracked focus or related signals to determine next steps and/or next focus events. Any combination of the above may be used to ascertain and track the focus of the user.

At block 504, the process 500 includes detecting a defocus event associated with a first region of the content. For example, the sensor system 214 may detect that a user has looked away from the first region toward another region or the user moved a focus or attention away from the screen to view the physical world.

At block 506, the process 500 includes determining a next focus event associated with a second region of the content. The determination may be based at least in part on the defocus event and on the tracked focus of the user corresponding to a gaze trajectory that occurred for a predefined time period before the detected defocus event. For example, the eye/gaze tracker 218 may track the focus as the user engages with content on virtual screen 226 and/or in the physical world view 304C. Movements or motion trajectories tracked by tracker 218 may be used in combination with one or more threshold conditions 254 and/or models 248 to predict what actions (e.g., events) the user may next perform. For example, the real-time user model 114 and a state of the user's attention/focus may be used in combination with detected UI models and UI states to predict which event/action may be next performed by the user.

In some implementations, the focus of the user is further determined based on a detected user interaction with the content (e.g., content 310). The next focus event may be determined according to the detected user interaction and a predefined next action in a sequence of actions associated with the content and/or associated with a UI depicted in the virtual screen 226. That is, device 100 may predict that if the user focus returns to the content 310, a next action may be to work in the music composition application on the next bar of music in the sequence based on the defocus event occurring with respect to the immediate prior bar of music. In some implementations, the second region may be part of different content than the first region in the event the user is predicted to be changing applications based on permission-based retrieved knowledge about prior user behavior. In some implementations, the second region may be part of different content than the first region in the event that a general motion trajectory is used by the models 248 to determine the next event will occur in other content.

At block 508, the process 500 includes generating, based on the determined next focus event, a focus transition marker for differentiating the second region of the content from a remainder of the content. For example, the content generator 252 may function with the sensor system 214 and the models 248 to determine the configuration and/or look of the focus transition markers 230 to place on the second region. For example, the device 100 may determine whether to generate content 232, UI effects 234, audio effects 236, tactile effects 238, and/or other visualizations to differentiate the second region from other content depicted in virtual screen 226.

In some implementations, the focus transition marker 230 represents a video or audio replay of detected changes in the content from a time associated with the defocus event and a time associated with the refocus event. In general, the replay of the detected changes may include visual or auditory cues corresponding to the detected changes. For example, the focus transition marker 230 may be a snippet of video, audio, or generated UI transitions based on the content that may have been missed between a defocus event and a refocus event carried out by the user and detected by tracker 218.

In some implementations, the focus transition marker 230 represents a replay of detected changes in the content from a time associated with the defocus event and a time associated with the refocus event where the replay of the changes include tactile cues corresponding to the changes. For example, the replay may include content that indicates that the user should select the focus transition marker 230 to review changes that may have occurred between the defocus event and the refocus event.

At block 510, the process 500 includes triggering execution of the focus transition marker at or associated with the second region in response to detecting a refocus event associated with the virtual screen. For example, the device 100 may generate the focus transition marker(s) 230, but may wait to execute and/or display the markers at or associated with the second region until the refocus event is detected.

In some implementations, the focus transition marker 230 associated with a particular defocus event may be configured to be suppressed in response to determining that substantive changes to the content depicted on the virtual screen have not occurred. For example, the device 100 may detect that no changes (or a minimum threshold level of changes) have occurred since the user defocus event that occurred with respect to content depicted on virtual screen 226. In response, the device 100 may not display the focus transition marker 230. In some implementations, the device 100 may instead soften an effect of the focus transition marker 230 by dimming and then brightening the last determined content that was focused upon before the defocus event.

In some implementations, the focus transition marker(s) 230 include at least one control and a highlighted indicator overlaid on a portion of the second region, as shown in FIG. 3D by highlight 336 and control 332. The focus transition marker may be gradually removed from display after a predefined time period after the refocus event. For example, the refocus content/markers 326 may be shown for a few seconds to a minute after the user refocuses on content in screen 302D.

In some implementations, the content depicts a sequence of motion. For example, the content may be a sequence in a sporting event with a moving ball. The first region may represent a first sequence of motion that the user has directed attention/focus to during the game. At some point, the user may defocus (e.g., look away) from the virtual screen 226. A second region may represent a second sequence of motion that is configured to occur after the first sequence. If the user defocuses after the first sequence of motion, the device 100 may continue to track content (e.g., the moving ball) during the second sequence of motion.

When the user refocuses, the device 100 may have generated focus transition makers 230 based on content tracking while the user was not providing attention to the game on screen 226. The transition marker 230 may depict the ball in the second region, but may show a trajectory of the ball between the first region and second region (e.g., between the first sequence of motion and the second sequence of motion and beyond) to quickly indicate to the user what has occurred during the game in the time between the defocus event and the refocus event. The transition marker 230 may be triggered for execution (and/or rendering) in a location associated with the second region of the content. In some implementations, triggering the focus transition marker 230 associated with the second region includes triggering the second sequence to execute with the focus transition marker 230 depicted on the second sequence of motion.

In some implementations, the content is presented in a user interface (e.g., shown by content 310, 312, and 314) of the virtual screen 302A. The sensor system 214 may detect user focus/attention to generate a model of an attention of the user based on the tracked focus of the user over a first time period engaged with the UI depicted in screen 302A. The device 100 may then obtain a model for the UI. The model for the UI may define a plurality of states of and user interactions associated with the UI. Based on the tracked focus of the user, the model of the attention, and a determined state, from the plurality of states, of the UI, the device 100 may trigger rendering, for a second time period, at least one focus transition marker (e.g., marker 326) overlaid on at least a portion of the second region of screen 302D and the content therein.

In some implementations, the virtual screen 226 is associated with an augmented reality device (e.g., wearable computing device 100) configured to provide a field of view that includes an augmented reality view (e.g., screen 302A) and a physical world view (e.g., 304A). In some implementations, tracking the focus of the user includes determining whether the focus of the user is a detected gaze associated with the augmented reality view (e.g., screen 302A) or a detected gaze associated with the physical world view (e.g., view 304A).

In some implementations, triggering execution of the focus transition marker associated with the second region includes restarting the content (e.g., performing a sequential replay of events/audio/visual associated with the content) from a time associated with the defocus event if the focus of the user is a detected gaze associated with the augmented reality view (e.g., 302A), and pausing and fading the content if the focus of the user is a detected gaze associated with the physical world view (e.g., 304A) until the refocus event is detected.

Figure 6:
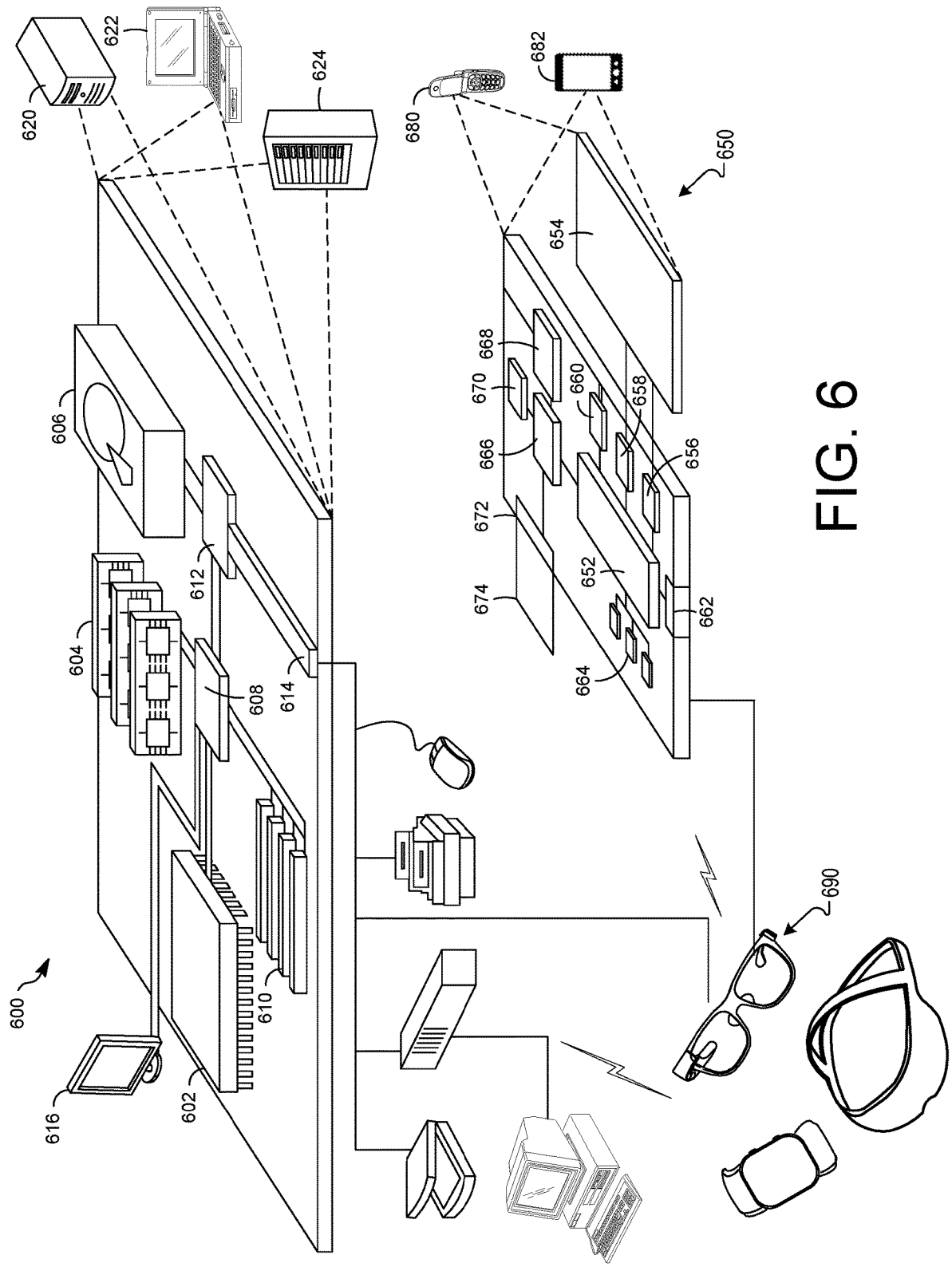
FIG. 6 illustrates an example of a computer device and a mobile computer device, which may be used with the techniques described herein.

FIG. 6 illustrates an example of a computer device 600 and a mobile computer device 650, which may be used with the techniques described here (e.g., to implement the client computing device 600, the server computing device 204, and/or mobile computing device 202). The computing device 600 includes a processor 602, memory 604, a storage device 606, a high-speed interface 608 connecting to memory 604 and high-speed expansion ports 610, and a low-speed interface 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display), an LED (Light Emitting Diode) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 690 to generate an augmented environment for viewing inserted content within the physical space. For example, one or more sensors included on a computing device 650 or other computing device depicted in the figure, can provide input to the AR headset 690 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 650 can use the sensors to determine an absolute position and/or a detected rotation of the computing device in the AR space that can then be used as input to the AR space. For example, the computing device 650 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space.

In some implementations, the AR headset/HMD device 690 represents device 600 and includes a display device (e.g., virtual screen) that may include a see-through near-eye display such as those using birdbath or waveguide optics. For example, such an optical design may project light from a display source onto a portion of teleprompter glass functioning as a beamsplitter seated at a 45-degree angle. The beamsplitter may allow for reflection and transmission values that allow the light from the display source to be partially reflected while the remaining light is transmitted through. Such an optic design may allow a user to see both physical items in the world next to digital images (e.g., UI elements, virtual content, focus transition markers, etc.) generated by the display. In some implementations, waveguide optics may be used to depict content on the virtual screen of device 600.

In some implementations, one or more input devices included on, or connect to, the computing device 650 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the AR space can cause a particular action to occur in the AR space.

In some implementations, a touchscreen of the computing device 650 can be rendered as a touchpad in AR space. A user can interact with the touchscreen of the computing device 650. The interactions are rendered, in AR headset 690 for example, as movements on the rendered touchpad in the AR space. The rendered movements can control virtual objects in the AR space.

In some implementations, one or more output devices included on the computing device 650 can provide output and/or feedback to a user of the AR headset 690 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the AR space. In the example of the laser pointer in an AR space, the computing device 650 appears as a virtual laser pointer in the computer-generated, 3D environment. As the user manipulates the computing device 650, the user in the AR space sees movement of the laser pointer. The user receives feedback from interactions with the computing device 650 in the AR environment on the computing device 650 or on the AR headset 690. The user's interactions with the computing device may be translated to interactions with a user interface generated in the AR environment for a controllable device.

In some implementations, a computing device 650 may include a touchscreen. For example, a user can interact with the touchscreen to interact with a user interface for a controllable device. For example, the touchscreen may include user interface elements such as sliders that can control properties of the controllable device.

Computing device 600 is intended to represent various forms of digital computers and devices, including, but not limited to laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the subject matter described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
    tracking an attention of a user with respect to content presented on a virtual screen;
    detecting a defocus event associated with a first region of the content, the defocus event including the attention of the user moving away from the virtual screen;
    determining a next focus event associated with a second region of the content, the determination being based at least in part on the defocus event and on the tracked attention of the user; and
    in response to detecting a refocus event associated with the virtual screen, executing, based on the determined next focus event, a marker differentiating the second region of the content from a remainder of the content, the refocus event including the attention of the user returning to the virtual screen, and the second region of the content corresponding to at least one change in the content after the defocus event.

2. The method of claim 1, wherein:
    the marker includes at least one control and a highlighted indicator overlaid on a portion of the second region; and
    the marker is gradually removed from display according to a predefined time period after the refocus event.

3. The method of claim 1, wherein:
    the attention of the user is further determined based on a detected user interaction with the content; and
    the next focus event is further determined according to the detected user interaction and a predefined next action in a sequence of actions associated with the content.

4. The method of claim 1, wherein:
    the content depicts a sequence of motion;
    the first region represents first sequence of motion;
    the second region represents a second sequence of motion configured to occur after the first sequence of motion; and
    executing the marker differentiating the second region of the content from the remainder of the content includes triggering the second sequence to execute with the marker depicted on the second sequence of motion.

5. The method of claim 1, wherein the marker associated with the defocus event is suppressed in response to determining that substantive changes to the content depicted on the virtual screen have not occurred.

6. The method of claim 1, wherein the marker represents a replay of detected changes in the content from a time associated with the defocus event and a time associated with the refocus event, the replay of the changes including tactile cues corresponding to the changes.

7. The method of claim 1, wherein the content is presented in a user interface of the virtual screen and the method further comprises:
generating a model of the attention of the user based on the tracked attention of the user over a first time period;
obtaining a model for the user interface, the model defining a plurality of states and interactions associated with the user interface; and
triggering rendering, for a second time period, at least one marker overlaid on at least a portion of the second region and based on the tracked attention of the user, the model of the attention, and a determined state, from the plurality of states, of the user interface.

8. The method of claim 1, wherein:
the virtual screen is associated with an augmented reality device configured to provide a field of view that includes an augmented reality view and a physical world view;
tracking the attention of the user includes determining whether the attention of the user is associated with the augmented reality view or associated with the physical world view; and
executing the marker differentiating the second region of the content from the remainder of the content includes,
restarting the content from a time associated with the defocus event if the attention of the user is associated with the augmented reality view, or
pausing and fading the content if the attention of the user is associated with the physical world view until the refocus event is detected.

9. A wearable computing device comprising:
at least one processing device;
at least one sensor;
a memory storing instructions that when executed cause the wearable computing device to perform operations including:
tracking, by the at least one sensor, a focus of a user with respect to a virtual screen;
detecting, by the at least one sensor, a defocus event associated with a first region of the virtual screen, the defocus event including the focus of the user moving away from the virtual screen;
determining, by the at least one sensor, a next focus event associated with a second region of the virtual screen, the determination being based at least in part on the defocus event and on the tracked focus of the user corresponding to a detected gaze trajectory of the user; and
in response to detecting, by the at least one sensor, a refocus event associated with the virtual screen, executing, based on the next focus event, a focus transition marker differentiating the second region of the virtual screen from a remainder of the virtual screen, the refocus event including the focus of the user returning to view the virtual screen, and the second region of the virtual screen corresponding to at least one change in first content displayed on the virtual screen.

10. The wearable computing device of claim 9, wherein:
the focus transition marker includes at least one control and a highlighted indicator overlaid on a portion of the second region; and
the focus transition marker is gradually removed from display according to a time period after the refocus event.

11. The wearable computing device of claim 9, wherein:
the focus of the user is further determined based on a detected user interaction with the virtual screen; and
the next focus event is further determined according to the detected user interaction and a predefined next action in a sequence of actions associated with the virtual screen.

12. The wearable computing device of claim 9, wherein:
the focus of the user with respect to the virtual screen corresponds to a focus of the user with respect to content depicted on the virtual screen;
the content depicts a sequence of motion;
the first region represents first sequence of motion;
the second region represents a second sequence of motion configured to occur after the first sequence of motion; and
executing the focus transition marker differentiating the second region of the virtual screen from the remainder of the virtual screen includes triggering the second sequence to execute with the focus transition marker depicted on the second sequence of motion.

13. The wearable computing device of claim 12, wherein the focus transition marker represents a video or audio replay of detected changes in the content from a time associated with the defocus event and a time associated with the refocus event, the replay of the detected changes including visual or auditory cues corresponding to the detected changes.

14. The wearable computing device of claim 12, wherein the focus transition marker represents a replay of detected changes in the content from a time associated with the defocus event and a time associated with the refocus event, the replay of the detected changes including tactile cues corresponding to the detected changes.

15. The wearable computing device of claim 12, wherein the content is presented in a user interface of the virtual screen and the operations further comprise:
generating a model of an attention of the user based on the tracked focus of the user over a first time period;
obtaining a model for the user interface, the model defining a plurality of states and interactions associated with the user interface; and
triggering rendering, for a second time period, at least one focus transition marker overlaid on at least a portion of the second region and based on the tracked focus of the user, the model of the attention, and a determined state, from the plurality of states, of the user interface.

16. The wearable computing device of claim 9, wherein:
the virtual screen is associated with an augmented reality device configured to provide a field of view that includes an augmented reality view and a physical world view; and
tracking the focus of the user includes determining whether the focus of the user is associated with the augmented reality view or associated with the physical world view.

17. A non-transitory, computer-readable medium having instructions stored thereon, the instructions, when executed by processing circuitry, cause a wearable computing device to:
track a focus of a user with respect to content presented on a virtual screen;
detect a defocus event associated with a first region of the content, the defocus event including the focus of the user moving away from the virtual screen;

determine a next focus event associated with a second region of the content, the determination being based at least in part on the defocus event and on the tracked focus of the user corresponding to a detected gaze trajectory of the user; and in response to detecting a refocus event associated with the virtual screen, execute, based on the determined next focus event, a focus transition marker differentiating the second region of the content from a remainder of the content, the refocus event including the focus of the user returning to view the virtual screen, and the second region of the content corresponding to at least one change in the content after the defocus event.

18. The computer-readable medium of claim 17, wherein: the focus transition marker includes at least one control and a highlighted indicator overlaid on a portion of the second region; and the focus transition marker is gradually removed from display according to a time period after the refocus event.

19. The computer-readable medium of claim 17, wherein: the focus of the user is further determined based on a detected user interaction with the content; and the next focus event is further determined according to the detected user interaction and a predefined next action in a sequence of actions associated with the content.

20. The computer-readable medium of claim 17, wherein the focus transition marker represents a video or audio replay of detected changes in the content from a time associated with the defocus event and a time associated with the refocus event, the replay of the detected changes including visual or auditory cues corresponding to the detected changes.

\* \* \* \* \*